United States Patent
Peter et al.

(10) Patent No.: US 12,514,457 B2
(45) Date of Patent: Jan. 6, 2026

(54) GUIDEWIRE SENSING APPARATUS

(71) Applicant: Baker Heart and Diabetes Institute, Melbourne (AU)

(72) Inventors: Karlheinz Peter, Melbourne (AU); Yung-Chih Chen, Melbourne (AU); Paul Stoddart, Melbourne (AU); Blanca Del Rosal Rabes, Melbourne (AU); Mircea Petre, Melbourne (AU)

(73) Assignee: BAKER HEART AND DIABETES INSTITUTE, Melbourne (AU)

( * ) Notice: Subject to any disclaimer, the term of this patent is extended or adjusted under 35 U.S.C. 154(b) by 203 days.

(21) Appl. No.: 18/040,334

(22) PCT Filed: Aug. 3, 2021

(86) PCT No.: PCT/AU2021/050845
§ 371 (c)(1),
(2) Date: Feb. 21, 2024

(87) PCT Pub. No.: WO2022/027094
PCT Pub. Date: Feb. 10, 2022

(65) Prior Publication Data
US 2023/0355105 A1 Nov. 9, 2023

(30) Foreign Application Priority Data
Aug. 4, 2020 (AU) .................. 2020902723

(51) Int. Cl.
*A61B 5/00* (2006.01)
*A61B 5/02* (2006.01)

(52) U.S. Cl.
CPC ........ *A61B 5/02007* (2013.01); *A61B 5/0084* (2013.01); *A61B 5/6851* (2013.01); *A61B 2562/0233* (2013.01)

(58) Field of Classification Search
CPC .................................... A61B 5/02007
See application file for complete search history.

(56) References Cited

U.S. PATENT DOCUMENTS

| 4,648,892 A | 3/1987 | Kittrell et al. |
| 4,718,417 A | 1/1988 | Kittrell et al. |

(Continued)

FOREIGN PATENT DOCUMENTS

| CA | 1279901 C | 2/1991 |
| CN | 109381167 A | 2/2019 |

(Continued)

OTHER PUBLICATIONS

International Preliminary Report on Patentability and Written Opinion mailed on Oct. 11, 2021 in International Application No. PCT/AU2021/050845, in 6 pages.

(Continued)

Primary Examiner — Joseph M Santos Rodriguez
(74) Attorney, Agent, or Firm — KNOBBE, MARTENS, OLSON & BEAR, LLP

(57) ABSTRACT

A sensing apparatus for performing sensing in a blood vessel of a biological subject includes a guidewire including a circumferential window positioned proximate a distal end, the guidewire being configured to be positioned in the blood vessel of the biological subject, an optical fiber extending substantially from a proximal end of the guidewire to a position proximate the window and a substantially conical reflector positioned proximate the window and aligned with an axis of the optical fiber. The conical reflector is configured to reflect stimulating radiation emitted from the optical fiber so that the stimulating radiation passes substantially radially through the window to thereby expose the blood vessel to the stimulating radiation and reflect sample radia- (Continued)

tion emitted from within the blood vessel so that the sample radiation is transmitted to the optical fiber.

20 Claims, 11 Drawing Sheets

(56) References Cited

U.S. PATENT DOCUMENTS

| | | | |
|---|---|---|---|
| 4,785,806 | A | 11/1988 | Deckelbaum |
| 4,981,138 | A | 1/1991 | Deckelbaum et al. |
| 5,046,501 | A | 9/1991 | Crilly |
| 5,275,594 | A | 1/1994 | Baker et al. |
| 5,507,287 | A | 4/1996 | Palcic et al. |
| 5,590,660 | A | 1/1997 | MacAulay et al. |
| 6,095,982 | A | 8/2000 | Richards-Kortum et al. |
| 6,186,780 | B1 | 2/2001 | Hibst |
| 6,258,576 | B1 | 7/2001 | Richards-Kortum et al. |
| 6,365,912 | B1 | 4/2002 | Booth et al. |
| 6,485,300 | B1 | 11/2002 | Muller et al. |
| 6,913,743 | B2 | 7/2005 | Licha et al. |
| 7,108,692 | B2 | 9/2006 | Frenz et al. |
| 7,328,058 | B2 | 2/2008 | Iwanczyk et al. |
| 7,486,985 | B2 | 2/2009 | Marshik-Geurts et al. |
| 7,539,530 | B2 | 5/2009 | Caplan et al. |
| 7,603,166 | B2 | 10/2009 | Casscells, III et al. |
| 7,865,231 | B2 | 1/2011 | Tearney et al. |
| 8,050,747 | B2 | 11/2011 | Tearney et al. |
| 8,060,187 | B2 | 11/2011 | Marshik-Geurts et al. |
| 8,958,867 | B2 | 2/2015 | Madden et al. |
| 8,971,997 | B2 | 3/2015 | Oral et al. |
| 9,351,702 | B2 | 5/2016 | Wang et al. |
| 9,513,276 | B2 | 12/2016 | Tearney et al. |
| 9,693,826 | B2 | 7/2017 | Neuberger |
| 9,918,643 | B2 | 3/2018 | Madden et al. |
| 10,085,802 | B2 | 10/2018 | Neuberger |
| 10,390,708 | B2 | 8/2019 | Nozaki |
| 10,517,669 | B2 | 12/2019 | Peled et al. |
| 10,835,127 | B2 | 11/2020 | Peter et al. |
| 2003/0044353 | A1 | 3/2003 | Weissleder et al. |
| 2003/0055307 | A1 | 3/2003 | Elmaleh et al. |
| 2004/0186383 | A1 | 9/2004 | Rava et al. |
| 2004/0243022 | A1 | 12/2004 | Carney et al. |
| 2005/0251116 | A1 | 11/2005 | Steinke et al. |
| 2005/0260677 | A1 | 11/2005 | Saaski |
| 2006/0041199 | A1 | 2/2006 | Elmaleh et al. |
| 2007/0073162 | A1 | 3/2007 | Tearney et al. |
| 2007/0078348 | A1 | 4/2007 | Holman |
| 2007/0167836 | A1 | 7/2007 | Scepanovic et al. |
| 2008/0058587 | A1 | 3/2008 | Boyden |
| 2008/0059070 | A1 | 3/2008 | Boyden et al. |
| 2008/0103355 | A1 | 5/2008 | Boyden et al. |
| 2008/0129993 | A1 | 6/2008 | Brennan et al. |
| 2008/0193376 | A1 | 8/2008 | Tawakol et al. |
| 2008/0221457 | A1 | 9/2008 | Zeng et al. |
| 2009/0036770 | A1 | 2/2009 | Tearney et al. |
| 2009/0073439 | A1 | 3/2009 | Tearney et al. |
| 2009/0175576 | A1 | 7/2009 | Tang |
| 2009/0192358 | A1 | 7/2009 | Jaffer et al. |
| 2009/0231578 | A1 | 9/2009 | Ling et al. |
| 2010/0094138 | A1 | 4/2010 | Gharib et al. |
| 2010/0272651 | A1 | 10/2010 | Georgakoudi et al. |
| 2010/0315632 | A1 | 12/2010 | Brennan, III |
| 2011/0275899 | A1 | 11/2011 | Tearney et al. |
| 2012/0022338 | A1 | 1/2012 | Subramaniam et al. |
| 2015/0080686 | A1 | 3/2015 | Karlheinz et al. |
| 2016/0267360 | A1 | 9/2016 | Madden et al. |
| 2017/0027427 | A1 | 2/2017 | Salsman et al. |
| 2017/0209049 | A1 | 7/2017 | Wang et al. |
| 2018/0040935 | A1 | 2/2018 | Sliwa et al. |
| 2019/0008376 | A1 | 1/2019 | Wortelboer et al. |
| 2019/0059734 | A1 | 2/2019 | Yamada |
| 2019/0076005 | A1 | 3/2019 | Song et al. |
| 2020/0405153 | A1 | 12/2020 | Peter et al. |
| 2021/0041366 | A1 | 2/2021 | Mamun et al. |

FOREIGN PATENT DOCUMENTS

| | | |
|---|---|---|
| DK | 2620119 T3 | 12/2015 |
| EP | 1153280 A2 | 11/2001 |
| EP | 1538968 B1 | 6/2008 |
| EP | 1357849 B1 | 10/2009 |
| EP | 2836128 A1 | 2/2015 |
| EP | 2620119 B1 | 9/2015 |
| EP | 2244626 B1 | 12/2017 |
| EP | 3267182 A1 | 1/2018 |
| EP | 3334321 B1 | 4/2019 |
| EP | 2974687 B1 | 11/2019 |
| EP | 3685783 A1 | 7/2020 |
| ES | 2555146 T3 | 12/2015 |
| ES | 2771673 T3 | 7/2020 |
| HU | E025580 T2 | 4/2016 |
| JP | 61-257638 A | 11/1986 |
| JP | 2000-503237 A | 3/2000 |
| JP | 2009-183459 A | 8/2009 |
| JP | 2012-065800 A | 4/2012 |
| JP | 2013-505468 A | 2/2013 |
| JP | 2016-506270 A | 3/2016 |
| JP | 2016-526415 A | 9/2016 |
| JP | 2017-519542 A | 7/2017 |
| JP | 2018-527982 A | 9/2018 |
| PT | 2620119 E | 11/2015 |
| PT | 2974687 T | 2/2020 |
| WO | WO 97/32182 A1 | 9/1997 |
| WO | WO 2005/052558 A1 | 6/2005 |
| WO | WO 2009/029216 A1 | 3/2009 |
| WO | WO 2011/038006 A1 | 3/2011 |
| WO | WO 2014/100140 A1 | 6/2014 |
| WO | WO 2014/205281 A2 | 12/2014 |
| WO | WO 2017/025423 A1 | 2/2017 |
| WO | WO 2017/147845 A1 | 9/2017 |
| WO | WO 2019/195881 A1 | 10/2019 |
| WO | WO 2022/027094 A1 | 2/2022 |

OTHER PUBLICATIONS

Komachi et al., Micro-optical fiber probe for use in an intravascular Raman endoscope, Applied Optics, vol. 44, No. 22, pp. 2942-2944, 2005.

Komachi et al., Raman probe using a single hollow waveguide, Optics Letters, vol. 30, No. 21, pp. 2942-2944, 2005.

Liang et al., Intravascular atherosclerotic imaging with combined fluorescence and optical coherence tomography probe based on a double-clad fiber combiner, Journal of Biomedical Optics, vol. 17, No. 7, p. 07050-1-07050-3, 2012.

Mavadia et al., An all-fiber-optic endoscopy platform for simultaneous OCT and fluorescence imaging, Biomedical Optics Express, vol. 3, No. 11, pp. 2851-2859, 2012.

Waxman et al., Near infrared spectroscopy for plaque characterization, Journal Interventional Cardiology, vol. 21, No. 6, pp. 452-458, 2008.

Extended European Search Report dated Jan. 2, 2025 issued in European Patent Application No. 22758630.2, in 11 pages.

Htun et al., Near-infrared autofluorescence induced by intraplaque hemorrhage and heme degradation as marker for high-risk atherosclerotic plaques, Nature Communications, 8:75, DOI: 10.1038/s41467-017-00138-x, 2017.

Jaffer, F.A. et al., Real-Time Catheter Molecular Sensing of Inflammation in Proteolytically Active Atherosclerosis, Circulation, vol. 118, pp. 1802-1809, 2008.

Jo, J. A. et al., Diagnosis of Vulnerable Atherosclerotic Plaques by Time-Resolved Fluorescence Spectroscopy and Ultrasound Imaging. Proceedings of the 28th IEEE EMBS Annual International Conference, pp. 2663-2666, 2006.

Le Grand et al., Superconductive tunnel junctions for X-ray spectroscopy, IEEE Transactions on Applied Superconductivity, vol. 3, No. 1, Part 4, pp. 2070-2075, 1993.

Office Action dated Oct. 9, 2024 in U.S. Appl. No. 17/023,108.

Paras, C. et al. Near-infrared autofluorescence for the detection of parathyroid glands, Journal of Biomedical Optics, vol. 16, No. 6, 067012, in 5 pages, 2011.

(56) References Cited

OTHER PUBLICATIONS

Pekola et al., Trapping of quasiparticles of a nonequilibrium superconductor, Applied Physics Letters, vol. 76, No. 19, pp. 2782-2784, 2000.
International Search Report & Written Opinion, mailed Oct. 11, 2021, in International Application No. PCT/AU2021/050845.
Advisory Action and Interview Summary dated Oct. 19, 2017 in U.S. Appl. No. 14/394,057.
Advisory Action and Interview Summary dated Feb. 7, 2019 in U.S. Appl. No. 14/394,057.
Advisory Action and Interview Summary dated Jan. 22, 2020 in U.S. Appl. No. 14/394,057.
Final Office Action dated Feb. 8, 2016 in U.S. Appl. No. 14/394,057.
Final Office Action dated Jul. 27, 2017 in U.S. Appl. No. 14/394,057.
Final Office Action dated Nov. 21, 2018 in U.S. Appl. No. 14/394,057.
Final Office Action dated Nov. 6, 2019 in U.S. Appl. No. 14/394,057.
Notice of Allowance dated Aug. 17, 2020 in U.S. Appl. No. 14/394,057.
Notice of Allowance dated Jul. 2, 2020 in U.S. Appl. No. 14/394,057.
Office Action dated Apr. 5, 2018 in U.S. Appl. No. 14/394,057.
Office Action dated Feb. 9, 2017 in U.S. Appl. No. 14/394,057.
Office Action dated Jun. 1, 2015 in U.S. Appl. No. 14/394,057.
Office Action dated May 28, 2019 in U.S. Appl. No. 14/394,057.
International Search Report issued in PCT/AU2013/000373 dated Jun. 11, 2013.
Japanese Office Action, dated Jan. 30, 2017, in Japanese Patent Application No. 2015-504818 X (with English translation).
Calfon, M.A., et al., In vivo Near Infrared Fluorescence (NIRF) Intravascular Molecular Imaging of Inflammatory Plaque, a Multimodal Approach to Imaging of Atherosclerosis, Journal of Visualized Experiments, 54, e2257, Aug. 2011.
Fang et al., "Diagnosis o f Vulnerable Atherosclerotic Plaques by Time-Resolved Fluorescence Spectroscopy and Ultrasound Imaging", IEEE, 2006, pp. 2663-2666.
Gillenwater et al., "Noninvasice Diagnosis of Oral Neoplasia Based on Fluorescence Spectroscopy and Native Tissue Autofluroescence", JAMA Otolaryngology—Head and Neck Surgery, vol. 124, No. 11, pp. 1251-1258, 1998.
Marcu et al., "Detection of rupture-prone atherosclerotic plaques by time-resolved laser-induced fluorescence spectroscopy", Atherosclerosis, vol. 204, pp. 156-164, 2009.
Park et al., "Biochemical characterization of atherosclerotic plaques by endogenous multispectral fluorescence lifetime imaging microscopy", Atherosclerosis, vol. 220, No. 2, pp. 394-401, 2012.
Piotrowski et al., Evidence for Lipid Peroxidation In Atherosclerosis, Life Sciences, vol. 46, pp. 715-721, 1990.
Piotrowski et al., Mature Human Atherosclerotic Plaque Contains Peroxidized Phosphatidylcholine as a Major Lipid Peroxide, Life Sciences, vol. 58, No. 9, pp. 735-740, 1996.
Weissleder, R., et al., In vivo imaging of tumors with protease-activated near-infrared fluorescent probes, Nature Biotechnology, vol. 17, pp. 375-378, Apr. 1999.
Zhu et al., Development of a Near Infrared Fluorescence Catheter: Operating Characteristics and Feasibility for Atherosclerotic Plaque Detection, Journal of Physics D: Applied Physics, vol. 38, pp. 2701-2707, 2005.
Calfon et al., Intravascular near-infrared fluorescence molecular imaging of atherosclerosis: toward coronary arterial visualization of biologically high-risk plaques, Journal of Biomedical Optics, 15(1), 011107, Jan./Feb. 2010, 6 pages.
Uchida et al., Visualization of Lipid Components in Human Coronary Plaques Using Color Fluorescence Angioscopy, Circulation Journal, vol. 74, pp. 2181-2186, 2010.
Office Action dated Apr. 16, 2025 issued in Japanese Patent Application No. 2023-507438, in 10 pages.
Office Action dated Aug. 4, 2025 in Japanese Patent Application No. 2023-507438, in 7 pages.

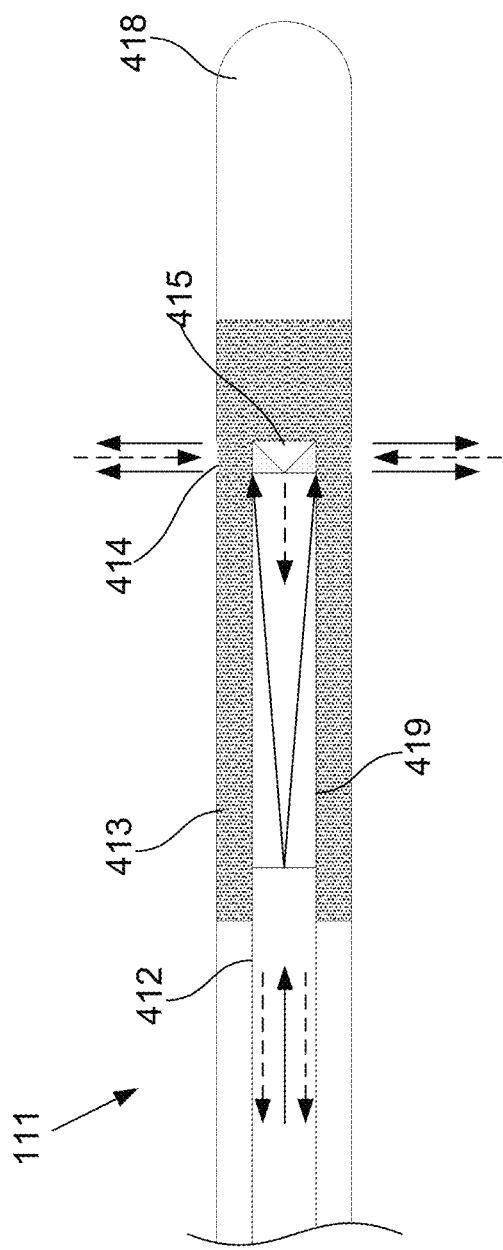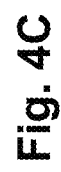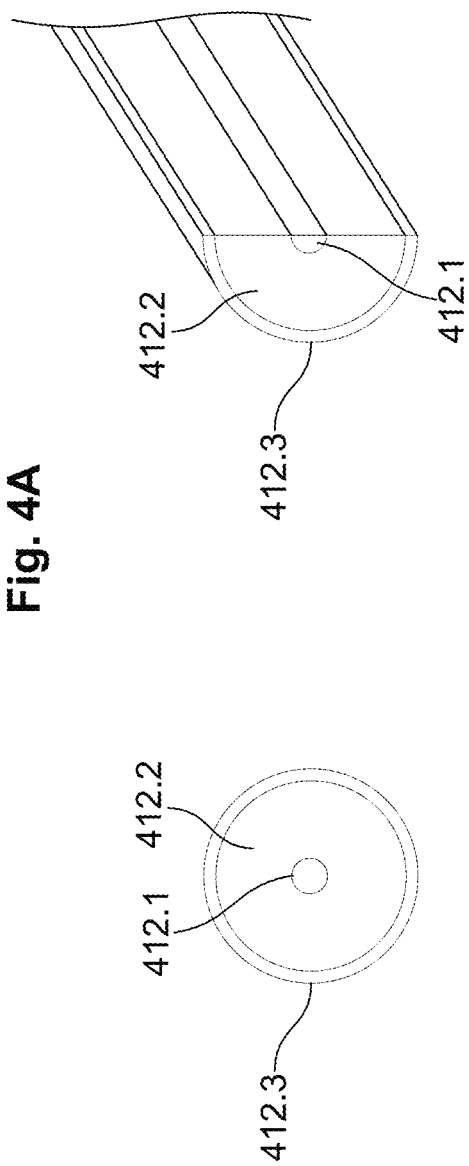
Fig. 4A
Fig. 4B
Fig. 4C

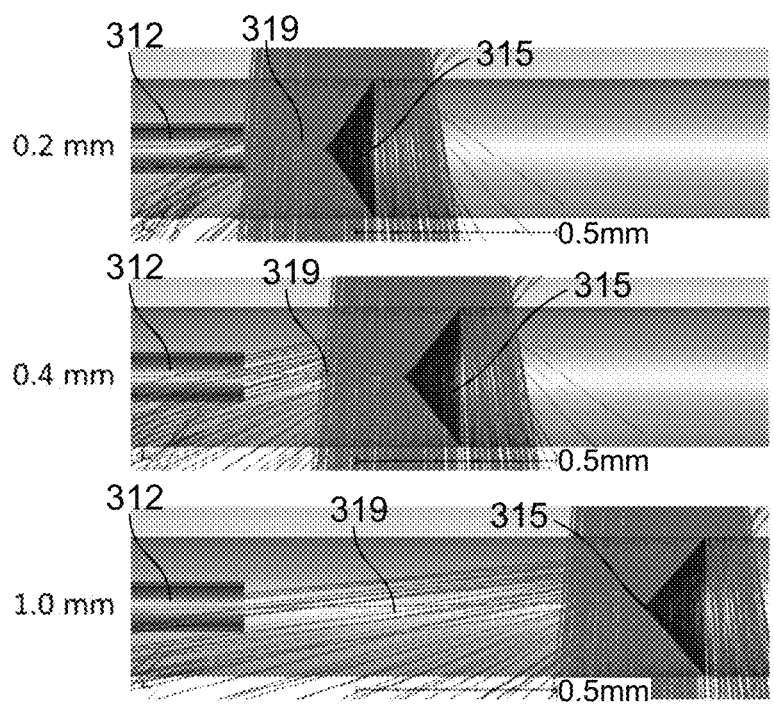
Fig. 7G
Fig. 7H
Fig. 7I
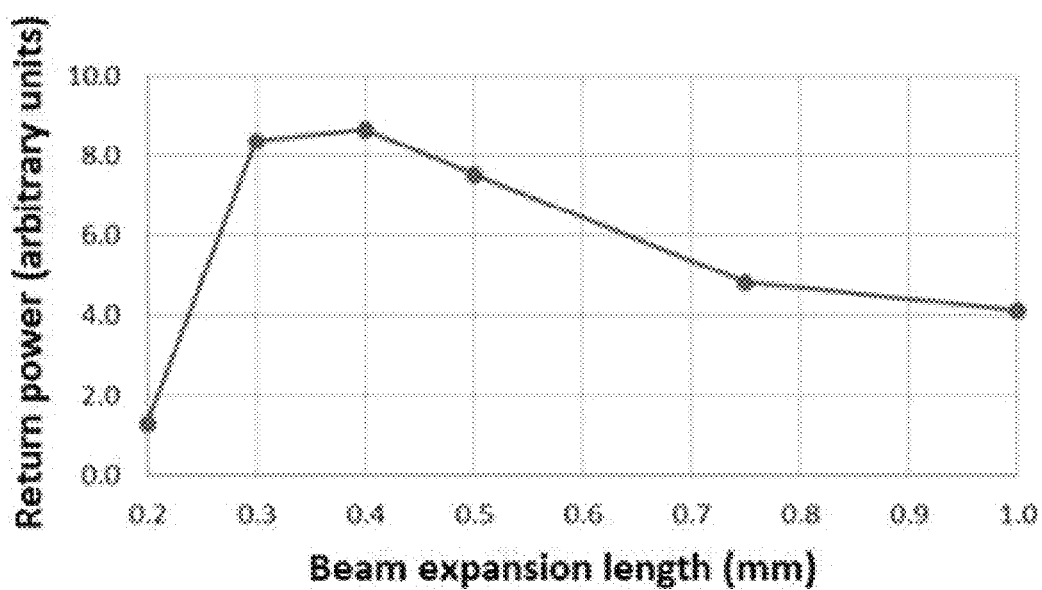
Fig. 7J

GUIDEWIRE SENSING APPARATUS

PRIORITY AND CROSS REFERENCE TO RELATED APPLICATIONS

This application is the U.S. National Phase Application under 35 U.S.C. § 371 of International Application No. PCT/AU2021/050845, filed Aug. 3, 2021, designating the U.S. and published in English as WO 2022/027094 A1 on Feb. 10, 2022, which claims the benefit of Australian Application No. AU 2020902723, filed Aug. 4, 2020. Any and all applications for which a foreign or a domestic priority is claimed is/are identified in the Application Data Sheet filed herewith and is/are hereby incorporated by reference in their entireties under 37 C.F.R. § 1.57.

BACKGROUND

The present invention relates to a sensing apparatus and an associated method for performing sensing in a blood vessel of a biological subject, and in one particular example to a sensing apparatus and an associated method for using a guidewire to perform sensing within a blood vessel, for example to detect vulnerable atherosclerotic plaques.

DESCRIPTION OF RELATED ART

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

Atherosclerosis is currently a leading cause of mortality and morbidity worldwide. Atherosclerotic plaques can affect different arteries at different sites of the body, potentially leading to a multitude of clinical presentations. These lesions can be totally asymptomatic for years, can present with stable symptoms like exertional angina, or can suddenly lead to life-threatening complications such as myocardial infarction or stroke.

Fatty streaks composed of foam cells (lipid-filled macrophages) are the earliest lesions in atherosclerosis. These fatty streaks are harmless and fully reversible. Only some of these progress to more advanced stages of atherosclerosis. More advanced plaques become irreversible and contain varying proportions of cells (including smooth muscle cells, macrophages and T-cells), extracellular matrix (including collagen, elastin and proteoglycans) and lipids (intracellular and extracellular). Different morphological types of plaques emerge depending on their composition. Some are fibrous plaques consisting of fibrous tissues and calcifications without lipid-rich core and some become fibroatheroma with lipid-rich core covered by a thin fibrous cap.

Atherosclerosis is widely regarded as an inflammatory disease. Inflammatory cells play a key role not only in the pathogenesis of plaque progression but also in destabilising the plaque (inflammatory cytokines and proteolytic enzymes cause the disruption of the fibrous cap leading to plaque rupture and complications).

The development of atherosclerotic plaques is quite diverse. Some plaques remain quiescent for years and some become complicated leading to plaque rupture or erosions. Complicated plaques are the cause of thrombosis and occlusion of the arteries leading to potentially catastrophic outcomes. Plaque rupture is the commonest cause of coronary thrombosis.

The plaques which are prone to rapid progression and thrombosis or rupture, commonly known as rupture prone, are called "high risk/vulnerable plaques". Thin-cap fibroatheroma (TCFA), which is the hallmark of vulnerable plaque is described to have a few classical morphological features, namely a thin fibrous cap of <65 µm, a large necrotic core, increased plaque inflammation, positive vascular remodelling, increased vasa-vasorum neovascularisation and intraplaque haemorrhage.

However, despite extensive advances in the field of cardiovascular medicine, the ability for early detection of the complication-prone plaques (high risk/vulnerable plaques) before they rupture, remains elusive.

Several invasive plaque imaging techniques are being developed to detect TCFA. These methods are far from ideal at the current state and could detect only some, not all, features of vulnerable plaques. For example, IVUS (intravascular ultrasound) is able to detect positive remodelling but with its resolution of 100 to 250 µm, it is impossible to detect fibrous cap thickness or plaque inflammation. IVUS-VH (Virtual Histology) uses IVUS backscatter radiofrequency signal to detect the composition of the plaque, especially necrotic core. Meanwhile, optical coherence tomography (OCT) with its high resolution (10-15 µm) has been proposed for detection of thin fibrous cap, macrophages and necrotic core but is not suitable for positive remodelling.

Other emerging methods include intravascular MRI (to detect the necrotic core), angioscopy (to visualise surface appearance of the plaque), thermography (to detect metabolic activity of the plaque) and spectroscopy.

Different types of spectroscopic imaging have been used for the characterization and detection of atherosclerotic plaques. Chemical composition of atherosclerosis has been successfully analysed by Raman spectroscopy and Fourier transform infrared (FT-IR) spectroscopy in various ex-vivo human atherosclerotic plaques.

Infrared reflection spectroscopy has been shown to be able to differentiate the different plaque components based on their characteristic absorbance/reflectance properties both in-vivo and in-vitro. InfraReDx, Inc. (Burlington, Mass., USA) developed an intracoronary probe using this technique which was later combined with IVUS (LipiScan IVUS system). The SPECTACL (SPECTroscopic Assessment of Coronary Lipid) trial was the first human multi-center study which demonstrated safety and feasibility of detection of lipid core-containing plaques by an intravascular NIRS (Near Infra-Red Spectroscopy) system in living patients.

UV (Ultra-Violet) fluorescence spectroscopy is used as another modality of spectroscopic assessment of atherosclerotic plaques. Some of the components of plaques such as collagen, elastin, some extracellular lipids and ceroids/lipofuscin have been shown to have intrinsic fluorescence when excited by ultraviolet light and visible light in the range of violet and blue (325 to 475 nm). However, UV fluorescence suffers from a number of drawbacks, including photon absorption and substantial tissue autofluorescence, making detection of plaques in this manner problematic.

WO2005/052558 describes methods and apparatus for classifying cancerous tissue using features of Raman spectra and background fluorescence spectra. The spectra may be acquired in the near-infrared wavelengths. Principal component analysis and linear discriminant analysis of reference spectra may be used to obtain a classification function that accepts features of the Raman and background fluorescence spectra for test tissue and yields an indication as to the likelihood that the test tissue is abnormal. The methods and apparatus are applied to screening for skin cancers or other diseases.

US2015/0080686 describes an apparatus that detects atherosclerotic plaques. The apparatus includes an electronic processing device that determines a level of fluorescence sensed by a sensor at a second infrared wavelength in response to exposure of at least part of an artery to radiation at a first infrared wavelength and determines a fluorescence indicator using the level of fluorescence. The fluorescence indicator is indicative of the presence, absence or degree of an atherosclerotic plaque.

Accordingly, this disclosure requires that an exogenous fluorescent agent is introduced into the artery in order for this approach to work. Additionally, the apparatus employed includes a catheter including one or more optical fibres extending between proximal and distal ends.

However, none of the above described arrangements provide a system for easily detecting vulnerable atherosclerotic plaques, or other features, within a blood vessel.

US2019/0059734 describes an optical coherence tomographic (OCT) system that includes a sample arm, a reference arm and an OCT probe. The probe irradiates a bodily lumen and a fluid contained within the bodily lumen with light of a sample beam transmitted through a double-clad fiber (DCF). A first detector detects light of a reference beam and light reflected from the bodily lumen and propagated through the core of the DCF to generate OCT interference signals. Light backscattered by the bodily lumen and by the fluid contained in the bodily lumen is propagated through a cladding of the DCF and detected by a second detector to generate an intensity signal. A processor analyzes the intensity signal, and triggers a pullback of the probe and initiates recording of OCT images of the bodily lumen in response to the intensity of the backscattered light reaching a predetermined threshold value.

CN109381167 describes a bimodal endoscope apparatus based on liquid lens self-focusing, it includes: shell, it is set to the rotary scanning cavity that reflecting mirror is had in shell, wherein: the OCE signal and fluorescence signal that rotary scanning cavity receives exciting light and output sample reflection by single mode optical fiber and multimode fibre respectively are to realize panoramic scanning, the present invention is by integrating OCE and FLE technology, real-time high resolution varifocal imaging is carried out to the structure and function inside organism, precisely effective morphological structure information image is provided accurately to monitor the early detection of gastrointestinal system disease, the quantitative optical for providing highly sensitive high specific simultaneously is concerned with and fluorescence two and three dimensions bimodal image.

WO2017/147845 describes an opto-acoustic integrated self-rotating endovascular imaging probe of built-in miniature motor type. The opto-acoustic integrated self-rotating endovascular imaging probe comprises a stainless steel tube, a light-permeable and sound-permeable housing sheathed on the stainless steel tube, a monomode optical fiber introduced into the light-permeable and sound-permeable housing by means of the stainless steel tube, a GRIN lens arranged inside the light-permeable and sound-permeable housing corresponding to the monomode optical fiber, an annular ultrasonic transducer sheathed on the GRIN lens, and an electromagnetic motor arranged in the light-permeable and sound-permeable housing. An end of a motor rotor located at the GRIN lens is provided with a reflecting inclined face. The reflecting inclined face is provided with a mirror face layer with high acoustic impedance. During retraction, IVUS images are obtained, optical detection with corresponding synchronous registration is simultaneously performed, and therefore opto-acoustic integrated images of vascular wall structure and composition with synchronous registration are obtained, and more comprehensive and accurate endovascular imaging is achieved.

An all-fiber-optic endoscopy platform for simultaneous OCT and fluorescence imaging by Jessica Mavadia, Jiefeng Xi, Yongping Chen, and Xingde Li, Biomedical Optics Express 3(11):2851, 1 Nov. 2012 describes an all-fiber-optically based endoscope platform for simultaneous optical coherence tomography (OCT) and fluorescence imaging. This design entails the use of double-clad fiber (DCF) in the endoscope for delivery of OCT source and fluorescence excitation light while collecting the backscattered OCT signal through the single-mode core and fluorescence emission through the large inner cladding of the DCF. Circumferential beam scanning was performed by rotating a 45° reflector using a miniature DC motor at the distal end of the endoscope. Additionally, a custom DCF coupler and a wavelength division multiplexer (WDM) were utilized to seamlessly integrate both imaging modalities to achieve an entirely fiber-optically based dual-modality imaging system.

Intravascular atherosclerotic imaging with combined fluorescence and optical coherence tomography probe based on a double-clad fiber combiner by Shanshan Liang, Arya Saidi, Joe Jing and Gangjun Liu, Journal of Biomedical Optics 17(7):070501, July 2012 describes a multimodality fluorescence and optical coherence tomography probe based on a double-clad fiber (DCF) combiner. The probe is composed of a DCF combiner, grin lens, and micromotor in the distal end. An integrated swept-source optical coherence tomography and fluorescence intensity imaging system was developed based on the combined probe for the early diagnoses of atherosclerosis. This system is capable of real-time data acquisition and processing as well as image display. For fluorescence imaging, the inflammation of atherosclerosis and necrotic core formed with the annexin V-conjugated Cy5.5 were imaged. Ex vivo imaging of New Zealand white rabbit arteries demonstrated the capability of the combined system.

However, all of the above approaches rely on imaging within the blood vessel, which in turn leads to a number of problems. For example, positioning of the imaging device within the blood vessel to image a point of interest can be problematic, and often requires that the device is positioned, with pullback being performed to move the imaging device at a constant rate past a feature of interest, allowing this to be imaged completely. Additionally, the optics of such a device typically require focussing on the feature, which in turn lead to complicated configurations requiring rotation of an imaging device, or focusing lenses or reflectors, in order to scan the imaging field of view to thereby image the entire feature.

U.S. Pat. No. 7,328,058 describes an apparatus for intravascular imaging to detect and characterize early-stage, unstable coronary artery plaques. The detector works by identifying and localizing plaque-binding beta-emitting radiopharmaceuticals.

Thus, this approach requires beta-emitting radiopharmaceuticals and in practice uses an optical fibre with a concave conical shaped mirror at its tip, which collects light emissions from a scintillating phosphor imaging plate formed in the shape of a tube surrounding the optical fibre. A sensitive photomultiplier tube is used to detect the low level of light emissions from the imaging plate. It will therefore be appreciated that this is a significantly complex arrangement, and in practice is implemented as a catheter deployed over a guidewire, which is not necessarily easy to use in practice. Additionally, this requires the use of beta-emitting radiopharmaceuticals, which in general is undesirable.

US 2009/0175576 describes an optical fiber tip comprising a core and a recess formed in said core at a distal end of the optical fiber tip, said recess having a vertex within said core.

However, this manufacturing technique limits the configuration of tip that can be produced, and the resulting arrangement is extremely delicate, making it unsuitable for many applications.

U.S. Pat. No. 10,517,669 describes a catheter device including a balloon structure and a side-firing laser lumen within the balloon to create lesions in the pulmonary vein (PV) in the treatment of atrial fibrillation. Mounted on the balloon so as to contact the PV when the balloon is inflated are one or more electrodes which may be used in a measurement mode, a treatment mode, or both. This arrangement only envisages irradiation of the vessel, and cannot perform optical detection techniques, and also requires that this is implemented as part of a catheter.

US2010/0094138 describes a device, system, and method for measuring the depth of a material layer such as a blood vessel plaque layer. A fiber optic bundle housed in a balloon catheter projects a laser dot toward a conical mirror, which reflects the dot perpendicularly onto the surface of the plaque. The laser dot is reflected back from the plaque layer with a substantially Gaussian intensity profile. A conical mirror directs the reflected image back to the fiber optic bundle, which delivers the image to a sensor. The depth of the plaque layer can be determined by comparing the diameter of the image intensity profile to a pre-obtained normalized data set.

However, again this is complex arrangement that in practice is implemented as a catheter deployed over a guidewire, which is not necessarily easy to use in practice.

US2021/0041366 discloses a spectroscopy probe for a Raman spectroscopy system, and methods for preparing filters for the probe. A method for forming an SERS substrate which can optionally be used with the probe is also described. The spectroscopy probe is formed using a double-clad optical fibre probe tip, the double-clad optical fibre (DCF) having a single mode core, multimode inner cladding, and outer cladding, and a micro-filter fixed to the distal end of the optical fibre probe tip. The micro-filter has a short pass or band pass filter configured to align with the DCF core to filter silica Raman background generated by laser excitation in the single mode core, and a long pass filter configured to suppress Rayleigh scattering from the sample while allowing Raman scattered wavelengths to be transmitted through the inner cladding. However, this forward viewing probe is not be able to continuously scan the walls/lumen of an artery due to the forward facing design.

SUMMARY

In one broad form, an aspect of the present invention seeks to provide a sensing apparatus for performing sensing in a blood vessel of a biological subject, the sensing apparatus including: a guidewire including: a circumferential window positioned proximate a distal end, the guidewire being configured to be positioned in the blood vessel of the biological subject; an optical fibre extending substantially from a proximal end of the guidewire to a position proximate the window; and, a substantially conical reflector positioned proximate the window and aligned with an axis of the optical fibre, the conical reflector being configured to: reflect stimulating radiation emitted from the optical fibre so that the stimulating radiation passes substantially radially through the window to thereby expose the blood vessel to the stimulating radiation; and, reflect sample radiation emitted from within the blood vessel so that the sample radiation is transmitted to the optical fibre; and, a radiation source coupled to the optical fibre and configured to emit stimulating radiation via the optical fibre; a detector configured to detect sample radiation received via the optical fibre; and, one or more processing devices configured to: analyse the detected sample radiation; and, generate an indicator indicative of results of the analysis.

In one embodiment at least one of the reflector and a distal end of the optical fibre are embedded in a supporting material.

In one embodiment the reflector includes a reflective surface coating.

In one embodiment the reflector includes at least one of: a curved conical surface; a curved conical surface configured to collimate stimulating radiation; an at least partially parabolic surface; and, a flat conical surface.

In one embodiment the reflector is configured to generate an annular beam of stimulating radiation having a longitudinal width of at least one of: greater than 10 µm; greater than 50 µm; less than 200 µm; and, about 100 µm.

In one embodiment the optical fibre is at least one of: a multimode optical fibre; and, a double clad optical fibre.

In one embodiment the optical fibre is a double clad optical fibre and the apparatus includes a beam expander coupled to a distal end of the double clad fibre, the beam expander being configured to allow the stimulating radiation to expand through diffraction so that a beam of the stimulating radiation has a diameter similar to or smaller than a diameter of the reflector.

In one embodiment the beam expander includes a multimode fibre spliced to the double clad optical fibre.

In one embodiment the radiation source includes a laser diode.

In one embodiment the radiation source generates radiation in the range 600 nm to 900 nm.

In one embodiment the apparatus includes a filter configured to filter sample radiation before the sample radiation reaches the detector.

In one embodiment the filter is a longpass filter configured to at least one of: transmit radiation having a wavelength greater than the wavelength of the stimulating radiation; transmit radiation having a wavelength of 20 nm or more greater than the wavelength of the stimulating radiation; and, suppress stimulating radiation.

In one embodiment the apparatus includes a coupler configured to couple the detector and the radiation source to the optical fibre.

In one embodiment the apparatus includes a reader including at least the detector and radiation source.

In one embodiment the apparatus includes a connector that physically decouples the optical fibre from the reader.

In one embodiment the apparatus includes a second detector configured to detect backscattered stimulating radiation.

In one embodiment the guidewire includes a metal sheath that is flexible in a transverse direction, but stiff in a longitudinal direction and under rotational movement about a longitudinal axis.

In one embodiment the guidewire includes at least one of: a radiopaque atraumatic tip; and, a shapeable section at a distal end.

In one embodiment the guidewire includes at least one of: a working length of at least one of: 1.5 to 2.0 m; 1.75 to 1.9 m; and, approximately 1.85 m; and, an outer diameter of at least one of: 300 µm to 400 µm; 325 µm to 375 µm; and, approximately 350 µm.

In one embodiment one or more processing devices configured to analyse the sample radiation by: determining a sample radiation characteristic based on signals received from the detector; use the sample radiation characteristic to identify if a feature is present in the blood vessel; and, generate an indicator if a feature is present.

In one embodiment the sample radiation characteristic is indicative of at least one of: a measured intensity of sample radiation; a value derived from a measured intensity of sample radiation; and, a change in a measured intensity of sample radiation.

In one embodiment the one or more processing devices are configured to analyse the sample radiation by: determining an intensity of sample radiation based on signals from the detector; comparing the intensity to a threshold; and, generating the indicator if the intensity exceeds the threshold.

In one embodiment the one or more processing devices includes at least one of: normalise a measured intensity of sample radiation based on at least one of: a measured intensity of backscattered stimulation radiation; and, a measured intensity of background radiation; and, select the threshold based on at least one of: a measured intensity of backscattered stimulation radiation; a measured intensity of background radiation; and, a composite value based on a measured intensity of backscattered stimulation radiation and a measured intensity of background radiation.

In one embodiment the apparatus includes an output configured to generate an at least one of: tactile feedback; an audible output indicative of the indicator; and, a visual output indicative of the indicator.

In one embodiment the sample radiation is emitted as a result of at least one of: Raman scattering; fluorescence; and, autofluorescence.

In one embodiment the sample radiation is emitted from a plaque within the blood vessel.

In one embodiment the indicator is indicative of at least one of: a presence of a vulnerable atherosclerotic plaque; and, a degree of vulnerability of a vulnerable atherosclerotic plaque. A sensing method including: positioning a guidewire in a blood vessel of a biological subject, the guidewire including: a circumferential window positioned proximate a distal end of the guidewire; an optical fibre extending substantially from a proximal end of the guidewire to a position proximate the window; and, a substantially conical reflector positioned proximate the window and aligned with an axis of the optical fibre, the conical reflector being configured to: reflect stimulating radiation emitted from the optical fibre so that the stimulating radiation passes substantially radially through the window to thereby expose the blood vessel to the stimulating radiation; and, reflect sample radiation emitted from within the blood vessel so that the sample radiation is transmitted to the optical fibre; using a radiation source coupled to the optical fibre to emit stimulating radiation via the optical fibre; using a detector to detect sample radiation received via the optical fibre; and, using one or more processing devices to: analyse the detected sample radiation; and, generate an indicator indicative of results of the analysis.

In one embodiment the method includes moving the guidewire within the blood vessel.

In one embodiment the method includes, in the one or more processing devices, analysing the sample radiation by: determining a sample radiation characteristic based on signals received from the detector; use the sample radiation characteristic to identify if a feature is present in the blood vessel; and, generate an indicator if a feature is present.

In one embodiment the sample radiation characteristic is indicative of at least one of: a measured intensity of sample radiation; a value derived from a measured intensity of sample radiation; and, a change in a measured intensity of sample radiation.

In one embodiment the method includes, in the one or more processing devices, analysing the sample radiation by: determining an intensity of sample radiation based on signals from the detector; comparing the intensity to a threshold; and, generating the indicator if the intensity exceeds the threshold.

In one embodiment the method includes, in the one or more processing devices, at least one of: normalise a measured intensity of sample radiation based on at least one of: a measured intensity of backscattered stimulation radiation; and, a measured intensity of background radiation; and, select the threshold based on at least one of: a measured intensity of backscattered stimulation radiation; a measured intensity of background radiation; and, a composite value based on a measured intensity of backscattered stimulation radiation and a measured intensity of background radiation.

In one embodiment the method includes: moving the guidewire within the blood vessel until an indicator is generated; and, identifying a location of a vulnerable atherosclerotic plaque based on a position of the guidewire.

In one embodiment the method includes, in response to output of an indicator: disconnecting the guidewire from the reader; inserting a catheter into the blood vessel over the guidewire; and, performing an intervention using the catheter.

In one broad form, an aspect of the present invention seeks to provide a guidewire for a sensing apparatus for performing sensing in a blood vessel of a biological subject, the guidewire including: a circumferential window positioned proximate a distal end, the guidewire being configured to be positioned in the blood vessel of the biological subject; an optical fibre extending substantially from a proximal end of the guidewire to a position proximate the window; and, a substantially conical reflector positioned proximate the window and aligned with an axis of the optical fibre, the conical reflector being configured to: reflect stimulating radiation emitted from the optical fibre so that the stimulating radiation passes substantially radially through the window to thereby expose the blood vessel to the stimulating radiation; and, reflect sample radiation emitted from within the blood vessel so that the sample radiation is transmitted to the optical fibre.

In one embodiment at least one of the reflector and a distal end of the optical fibre are embedded in a supporting material.

In one embodiment the reflector includes a reflective surface coating.

In one embodiment the reflector includes at least one of: a curved conical surface; a curved conical surface configured to collimate stimulating radiation; an at least partially parabolic surface; and, a flat conical surface.

In one embodiment the reflector is configured to generate an annular beam of stimulating radiation having a longitudinal width of at least one of: greater than 10 µm; greater than 50 µm; less than 200 µm; and, about 100 µm.

In one embodiment the optical fibre is at least one of: a multimode optical fibre; and, a double clad optical fibre.

In one embodiment the optical fibre is a double clad optical fibre and the apparatus includes a beam expander coupled to a distal end of the double clad fibre, the beam expander being configured to allow the stimulating radiation to expand through diffraction so that a beam of the stimulating radiation has a diameter similar to a diameter of the reflector.

In one embodiment the beam expander includes a multimode fibre spliced to the double clad optical fibre.

In one embodiment the guidewire includes a connector that physically decouples the optical fibre from a reader.

In one embodiment the guidewire includes a metal sheath that is flexible in a transverse direction, but stiff in a longitudinal direction and under rotational movement about a longitudinal axis.

In one embodiment the guidewire includes at least one of: a radiopaque atraumatic tip; and, a shapeable section at a distal end.

In one embodiment the guidewire includes at least one of: a working length of at least one of: 1.5 to 2.0 m; 1.75 to 1.9 m; and, approximately 1.85 m; and, an outer diameter of at least one of: 300 µm to 400 µm; 325 µm to 375 µm; and, approximately 350 µm.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:—

FIG. 4A is a schematic diagram of a further alternative example of a tip of the guidewire of FIG. 1A;

FIG. 4B is a schematic end view of an example of a double clad optical fibre;

FIG. 4C is a schematic perspective cut-away view of the double clad optical fibre of FIG. 4B;

FIGS. 7G to 7I are schematic diagrams of examples of ray tracing simulations for progressively increasing lengths of beam expansion section;

FIG. 7J is a graph showing a relationship between return power of the sample radiation with increasing beam expansion length; and, FIG. 8 is a scanning electron microscope image of an example of a conical reflector.

DETAILED DESCRIPTION

An example of a sensing apparatus will now be described with reference to FIGS. 1A and 1B.

In this example, the apparatus 100 includes a guidewire 110 connected to a reader 120, which incorporates electronics to allow sensing to be performed using the guidewire 110.

Figure 1A:
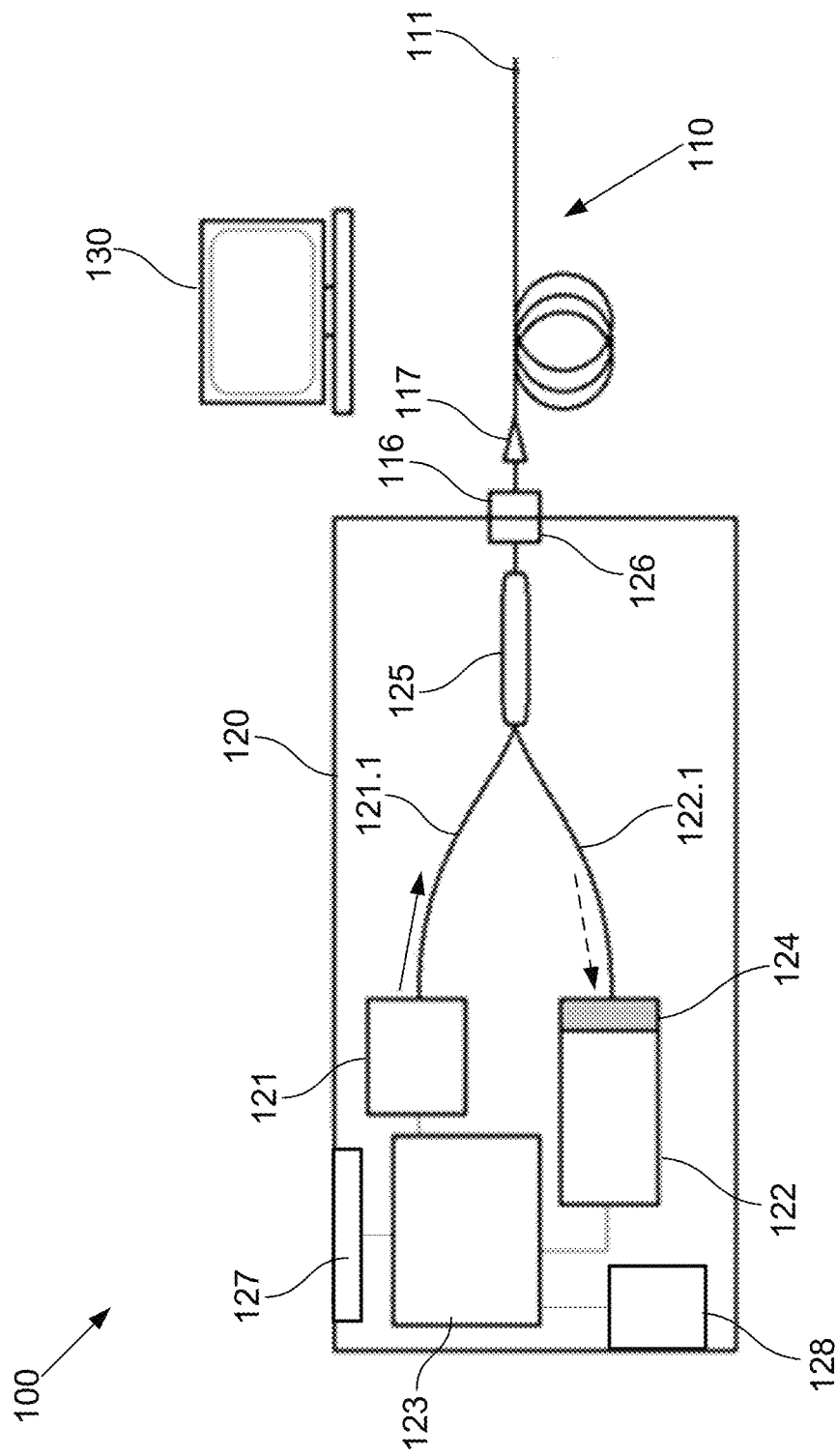
FIG. 1A is a schematic diagram of an example of a sensing apparatus for performing sensing in a blood vessel of a biological subject.
Figure 1B:
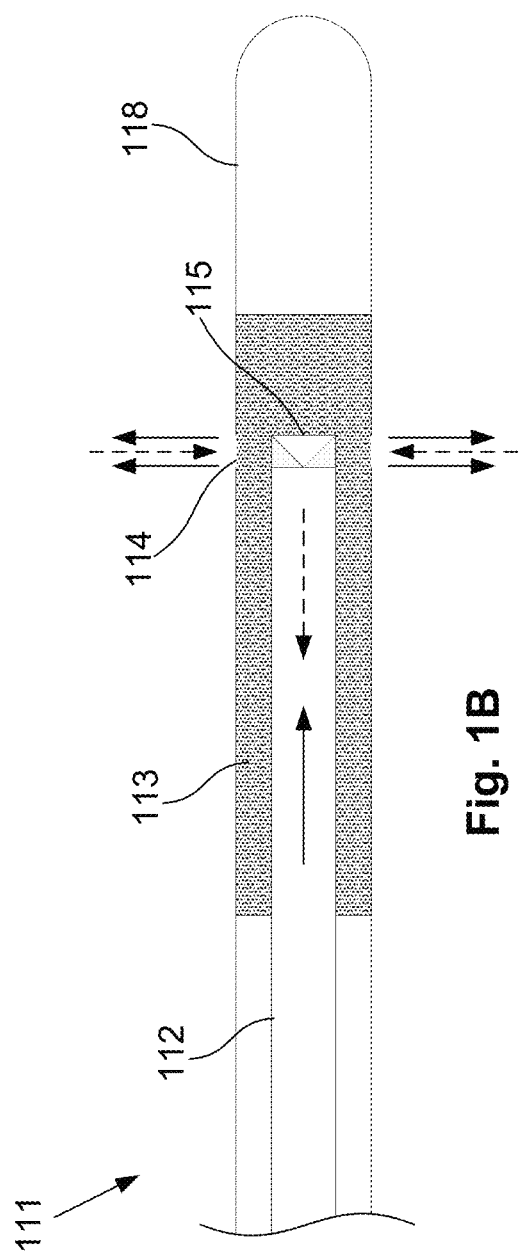
FIG. 1B is a schematic diagram of an example of a tip of the guidewire of FIG. 1A.

A distal end 111 of the guidewire 110, shown in more detail in FIG. 1B, is fed into the blood vessel of a biological subject in use to allow sensing to be performed therein. The guidewire includes a circumferential window 114 positioned proximate the distal end 111, with an optical fibre 112 extending substantially from a proximal end of the guidewire to a position proximate the window. A substantially conical reflector 115 is positioned proximate the window 114. In one particular example, the conical reflector 115 is provided radially inwardly of the window 114, and is aligned with an axis of the optical fibre 112, with an end of the optical fibre 112 being provided adjacent to, or in abutment with, the conical reflector 115.

In order to maintain the physical relationship of the distal end of the optical fibre 112 and the reflector 115, these may be embedded in a supporting material, such as a silicone potting 113, or similar, which is transmissive to the stimulating and sample radiation. It will be appreciated however that other suitable arrangements could be used.

In use, the conical reflector 115 is configured to reflect stimulating radiation (shown by solid arrows) emitted from the optical fibre 112 so that the stimulating radiation passes substantially radially through the window 114 to thereby expose the blood vessel to the stimulating radiation. Additionally, the conical reflector 115 is configured to reflect sample radiation emitted from within the blood vessel (shown by the dotted arrows) so that the sample radiation is returned to the optical fibre 112. Specifically, in one example, the window 114 extends substantially around the entire circumference of the guidewire 110, which in combination with the conical shape of the reflector 115 ensures that stimulating radiation is emitted over the entire guidewire circumference, whilst sample radiation is received from within the blood vessel around the entire circumference of the guidewire. The nature of the window will vary and could include a material that transmits the radiation, or could be an opening, optionally including a mesh or struts to provide physical support, whilst minimising obstruction to transmitted radiation.

In this example, reader 120 includes a radiation source 121 and a detector 122, which are optically coupled to the optical fibre 112. The radiation source 121 is configured to emit stimulating radiation via the optical fibre 112, whilst the detector 122 is configured to detect sample radiation received via the optical fibre 112. The radiation source 121 and detector 122 can be of any appropriate form, depending on the nature of sensing being performed, but in one example, include a laser diode and photodiode. The radiation source 121 is generally configured to generate stimulating radiation with a specific wavelength or wavelength range (generally referred to as a stimulating wavelength), while the detector 122 can also be configured to detect sample radiation with a specific wavelength or wavelength range (generally referred to as a sample wavelength), which is different to the stimulating wavelength. It will be noted in this context that the terms stimulating wavelength and sample wavelength encompass radiation spanning a wavelength range or including multiple wavelengths and is not necessarily intended to be limited to specific wavelength.

The nature of the stimulating and sample wavelengths will vary depending on the sensing being performed and may, for example, depend on stimulation and emission characteristics of features being detected. For example, when detecting atherosclerotic plaques, stimulating radiation with a stimulating wavelength in the range 600 nm-900 nm may be used, with sample radiation in the form of autofluorescence being detected at a longer sample wavelength. It will be appreciated however that other suitable ranges could be used, and in some situations sample radiation may be detected at a wavelength shorter than that of the stimulating radiation.

One or more processing devices 123 can also be provided that are configured to analyse the detected sample radiation and generate an indicator indicative of results of the analysis. The processing device 123 is typically any electronic processing device such as a microprocessor, microchip processor, logic gate configuration, firmware optionally associated with implementing logic such as an FPGA (Field Programmable Gate Array), or any other electronic device, system or arrangement. Whilst the system can use multiple processing devices, with processing performed by one or more of the devices, for the purpose of ease of illustration, the following examples will refer to a single device, but it will be appreciated that reference to a singular processing device should be understood to encompass multiple processing devices and vice versa, with processing being distributed between the devices as appropriate. The processing device 123 typically forms part of the reader, but this is not essential and a remote processing device 123 could be used, or alternatively processing could be distributed between processing devices 123 in and external to the reader 120.

The nature of the analysis performed will vary depending on the preferred implementation and the nature of the feature being detected. For example, if the feature emits radiation at a characteristic wavelength, this could include sensing an intensity of sample radiation emitted at the characteristic wavelength, and comparing this to a threshold to ascertain if a feature is present.

Figure 2:
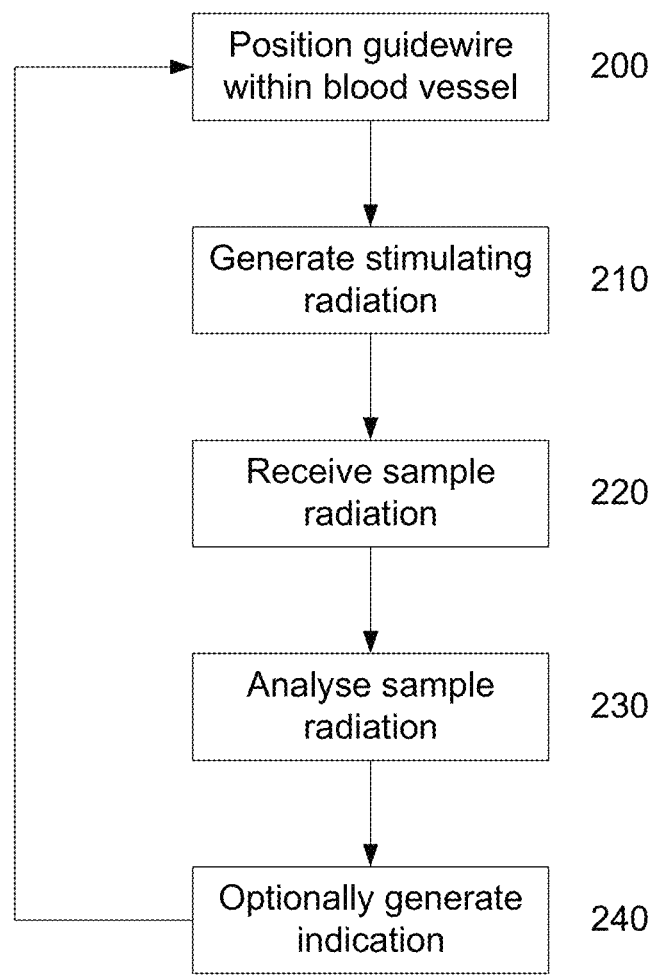
FIG. 2 is a flow chart of an example of a method for performing sensing in a blood vessel of a biological subject.

An example of operation of the apparatus to perform sensing will now be described with reference to FIG. 2.

In this example, at step 200, the guidewire 110 is positioned in the blood vessel, and sensing commenced by having the radiation source 121 generate stimulating radiation. The stimulating radiation is transferred along the guidewire via the optical fibre 112, so that it can be reflected by the reflector 115 and emitted laterally from the guidewire 110 via the window 114, thereby exposing an inside of the blood vessel, and any features therein, to the stimulating radiation. Any resulting radiation reflected or otherwise emitted, can then be returned to the detector 122, via the window 114, the conical reflector 115 and the optical fibre 112, allowing this to be received by the detector 122 at step 220.

For example, in the event that the blood vessel contains a feature such as a vulnerable atherosclerotic plaque, if this is exposed to stimulating radiation, the plaque will autofluoresce at a different longer wavelength, resulting in sample radiation being transferred to and received by the detector 122. In the case of a vulnerable atherosclerotic plaque, the stimulating radiation may be in a 600-900 nm wavelength range, although other wavelength ranges may be used. It will be appreciated that the sample radiation could be emitted as a result of mechanisms other than autofluorescence, including fluorescence, Raman scattering, or the like. Accordingly, it will be appreciated that other suitable wavelength ranges could be used for detecting other features.

At step 230, the processing device 123 can analyse detected radiation and ascertain if this is characteristic of a feature of interest, such as a vulnerable atherosclerotic plaque. Thus, the processing device can compare an intensity and/or sample wavelength of any detected sample radiation to a threshold or characteristic wavelength, to determine if the sample radiation is indicative of a feature of interest. Additionally, and/or alternatively, the sample radiation could be analysed over multiple wavelengths, for example, by examining spectra of the sample radiation and comparing this to reference spectra indicative of different features, allowing features to be detected and/or identified.

In the context of atherosclerotic plaque, appropriate stimulation wavelengths, and analysis of resulting sample radiation resulting from autofluorescence of the atherosclerotic plaque can be used to identify if the atherosclerotic plaque is vulnerable. Techniques for performing such sensing and analysis are described in more detail in US20150080686, the contents of which is incorporated in its entirety herein by cross reference.

Thus, in this instance, the apparatus can be used to analyse an intensity of infrared fluorescence emitted by an atherosclerotic plaque, which can then be used to ascertain a degree of vulnerability of the plaque, hence allowing a medical practitioner to identify a suitable treatment regime, such as placement of a stent over the plaque. In this example, sensing of fluorescence is carried out by using a stimulating wavelength, with detection of the fluorescence being performed at a different sample wavelength, which is longer that the stimulating wavelength. This allows stimulating radiation used to expose the tissue to be distinguished from fluorescence, and in particular to prevent stimulating radiation causing a spurious result.

It will also be appreciated that stimulating radiation and sample radiation can be distinguished in other manners, for example using a time resolved technique. In particular, there is typically a small time delay between exposure of tissue and subsequent generation of fluorescence, typically in the order of a few nano-seconds. Accordingly, the sensing device can be adapted to only detect radiation after the radiation source has ceased emitting radiation, for example using a gated sensing device, thereby ensuring that detected radiation includes only radiation resulting from fluorescence.

If a feature of interest is detected, an indication, such as a visual and/or audible alert, can optionally be generated and presented via an optional output device 130 at step 240, allowing appropriate action to be taken, such as to allow an intervention to be performed. In the event no feature of interest is detected, then the guidewire continues to be moved along the blood vessel, allowing this process to be repeated continuously until checking of the blood vessel is complete and/or a feature of interest is detected.

It will be appreciated that in the above described arrangement, use of the conical reflector and circumferential window allows an entire circumferential region of the blood vessel to be exposed to stimulating radiation and allows sample radiation to be collected over this entire region, so that moving the guidewire continuously (or substantially continuously) allows entire sections of the blood vessel to be monitored in a continuous process.

As a result, this avoids the need for an imaging device or reflector to be rotated to scan an inside of the blood vessel, as is required in traditional prior art approaches, which reduces the complexity of the sensing arrangement and its operation. For example, this avoids the need for rotational mechanisms to be built into the system, and/or for a user to move and rotate the device manually. Such synchronisation of rotation and pull back is extremely challenging, taking into account the potential for one or both movements (depending on the configuration) to be disrupted by changes in friction and lags between proximal and distal ends.

Furthermore, the guidewire does not need to be held statically within the blood vessel to allow scanning or other similar processes to be performed, and instead detection can be performed as the guidewire is moved continuously within the blood vessel. This allows an operator to simply position the guidewire within the blood vessel, activate the reader, and then move the guidewire along the vessel until a feature is detected and a corresponding indicator determined. This therefore reduces the complexity of the scanning process, as well as the time taken to perform sensing, and provides a more straightforward and effective mechanism in order to identify features within a blood vessel. In this regard, it will be noted that sensing of this form leverages knowledge that physical interventions, such as stents or balloons, have radial symmetry, meaning localising a feature in the circumferential/radial direction provides no practical benefit. Conversely, the longitudinal position in the vessel is required information, and so the arrangement uses circumferential exposure of substantially an entire annular portion of the vessel in order to localise features longitudinally, whilst avoiding the complexity of circumferential/radial localisation.

Additionally, avoiding imaging reduces the complexity of the signal processing required, in turn allowing an indication to be generated substantially in real time, as the guidewire is moved along the vessel. This also avoids the need to collect image data with a required spatial resolution needed to make a useful diagnosis, which can limit the rate at which sensing can be performed with prior art techniques. Additionally, as previously described, in traditional arrangements, the rate of lateral movement and rotational movement may be interdependent to ensure the entire inner surface of the vessel is scanned, whereas the above described arrangement provides more flexibility in rate of movement along the blood vessel. This not only allows measurements to be collected more rapidly, and with less regard to speed of movement, but also allows a user to stop, and then move back and forth over a feature, without difficulty, allowing improved feature detection to be performed.

Thus, this allows an operator, such as a clinician or surgeon, to simply insert the guidewire into the vessel and move the guidewire progressively along the vessel as sensing is performed. In the event that a feature is detected, an indication such as an audible or visual alert can be generated, allowing the operator to cease movement of the guidewire, with the guidewire position then being used to locate the feature in the blood vessel, allowing an intervention to be performed.

It will be noted that the above described arrangement is implemented using a guidewire, which is significantly different to catheter based arrangements.

For example, a guidewire can be deployed without any additional deployment mechanism, whereas a catheter can only be deployed using an additional equipment to position the catheter within a blood vessel. As a result, the workflow that could be achieved using a catheter based system would be relatively inefficient due to the need to repeatedly insert and remove the catheter in order to insert a stenting catheter.

Additionally, guidewires have sufficient flexibility, and in some cases a degree of manipulation, that allows these to be easily positioned within an artery. Conversely, in the case of catheters, this still require a guidewire in order to position the catheter within the artery, and as a result, a transverse view of the radial reflector would be blocked on one side by the guidewire, leading to loss of signal from parts of the artery. This means in practice a catheter based approach suffers from a number of drawbacks making this unsuitable for practical applications.

Additionally, as will be appreciated by persons skilled in the art, guidewires typically have smaller diameters than catheters. For example, a standard coronary guidewire typically has a diameter of 350 µm, whereas traditional sensing catheter based arrangements typically have a diameter of the order of 1 mm (in the case of InfraReDx, Inc mentioned above) or 600 µm (described as an endoscopic probe, in Komachi Y, Sato H, Matsuura Y, Miyagi M, Tashiro H, "Micro-optical fiber probe for use in an intravascular Raman endoscope," (2005) Opt Lett 30:2942-2944). This means it would not be feasible to simply implement the teaching of the prior art in a guidewire.

In this regard, a number of the prior art arrangements utilise multiple optical fibres, which is generally incompatible with a standard coronary guidewire size of 350 µm. NIR spectroscopy would not normally be considered a low light level technique as it is based on reflected light levels. However, if the measurements are conducted in blood rather than relying on vessel flushing, vessel occlusion, or tissue apposition, then the signal level will be degraded. Thus the longitudinal pullback speed is restricted to 0.5 mm/s which is insufficient for practical applications.

Thus, based on these examples of spectroscopic measurements of low light level signals, which are all currently implemented in catheters or endoscopic devices with relatively large diameters, it is apparent that these spectroscopic techniques could not be practically implemented in a guidewire.

In contrast, the above described arrangement provides a degree of flexibility and small size to be deployed as a guidewire, and that it can be used to perform spectroscopic measurements of low level light signals, i.e. measurements of the intensity of light at different wavelengths.

A number of further features will now be described.

The guidewire can be of any appropriate form, but typically includes a metal sheath that is flexible in a transverse direction, but stiff in a longitudinal direction and under rotational movement about a longitudinal axis. In one example, the guidewire is a stainless steel and/or Nitinol (nickel titanium) coiled or braided wire or slotted tube, that is optionally coated with a polymer, such as silicone or polytetrafluoroethylene (PTFE), to increase lubricity.

Hydrophilic coatings can also be used to reduce friction during deployment and to allow for easier movement within tortuous blood vessels.

The guidewire typically includes a tip 118 at a distal end 111 of the catheter which is used to allow the guidewire to navigate along the blood vessels. The tip can come in various configurations, including a "J" curve, a variety of angles or straight tips to help navigate various vessel anatomies. More typically however the tip 118 is a radiopaque atraumatic tip, or tip including a radiopaque feature, including a shapeable section at the distal end. This allows a shape of the tip to be adjusted to facilitate navigation through the blood vessels, whilst the radiopaque nature allows a location of the tip within the blood vessel to be sensed using sensing arrangements, such as X-ray or the like. It will be appreciated that any offset between the radiopaque feature and the window may need to be accounted for when localising the feature, although in another example, a metallic mirror coating on the conical reflector may serve the dual purpose of providing a radiopaque region. This would improve the estimate of the longitudinal position of the signal location, and could be enhanced by increasing a thickness of the mirror coating above what is required for a high reflectance mirror, should this be beneficial for radiopacity.

The guidewire typically includes a working length of 1.5 to 2.0 m, 1.75 to 1.9 m, or more typically approximately 1.85 m, whilst the guidewire typically includes an outer diameter of 300 μm to 400 μm, 325 μm to 375 μm and more typically approximately 350 μm. The guidewire 110 may also include handle 117 to allow insertion and manipulation of the guidewire 110 position.

A connector, including male and female connectors parts 116, 126 can be provided, that physically decouples the guidewire 110 and optical fibre 112 from the reader 120, thereby allowing the guidewire 110 to be separated from the reader 120. This can be used to allow a catheter or other surgical implement to be fed over the guidewire 110, allowing an intervention to be performed as required, for example allowing a stent to be positioned within the blood vessel. The connector may include a clamping mechanism and/or removable handle that serves to align the fibres on either side of the connector, and assists with handling, and in particular rotation of the guidewire.

In one example, the reader 120 and the handle 117 could be combined into a single component, with the connector being positioned between the reader 120 and rest of the guidewire, allowing the handle 117 and reader 120 to be disconnected from the guidewire. The connector 116 may be intended to rotate freely, to allow the guidewire to be rotated, without requiring rotation of the reader 120. This can assist in manipulating the guidewire within the subject, whilst avoid the need to also rotate the reader 120, which could be problematic if the reader is of significant size. In this case, the connector 116 lacks the capacity to transmit a rotational force, and so the handle 117 can be positioned between the connector 116 and the tip of the guidewire, allowing the handle to be used to rotate the guidewire. In this situation the handle 117 would be removable, for example by allowing the handle to slide off or clamp onto the guidewire, allowing equipment such as catheters, stents or similar, to be passed along the guidewire as mentioned above.

Typically, the radiation source includes a laser diode, although other suitable sources could be used. The radiation source 121 generates stimulating radiation in the range 600 nm to 900 nm, with a power level below the thermal damage threshold of the blood vessel. In one particular example, the radiation source 121 generates stimulating radiation in one or more of the wavelength ranges 600 nm-900 nm, 650 nm-850 nm, 700 nm-850 nm, 750 nm-850 nm, 800 nm-850 nm, 650 nm-800 nm, 700 nm-800 nm, 750 nm-800 nm, 650 nm-700 nm, 650 nm-750 nm, 650 nm-800 nm, or 700 nm-750 nm. However, it will be appreciated that other ranges could be used depending on the preferred implementation and the nature of the feature being detected, so for example wavelengths of 500 nm or lower could be used.

The power level of the radiation source could also be modulated to ensure this is safe. For example, a measurement of the intensity of backscattered sample radiation could be used to modulate the radiation source so that it maintains a safe intensity on the tissue and prevents excessive variations in sensitivity as the vessel diameter changes.

The nature of the detector will vary depending on the preferred implementation, and could include a photodetector, photomultiplier, infrared camera, spectrometer, or the like.

To allow sensing to be performed at specific sample wavelengths, the apparatus typically includes a filter 124 configured to filter sample radiation before the sample radiation reaches the detector 122. In one example, the filter 124 is a longpass filter configured to transmit radiation having a wavelength 20 nm greater than the wavelength of the stimulating radiation.

In one example, sensing is performed at a wavelength longer than that of the stimulating radiation and in particular, in one or more of the wavelength ranges 600 nm-1150 nm, 650 nm-1150 nm, 700 nm-1150 nm, 750 nm-1150 nm, 800 nm-1150 nm, 850 nm-1150 nm, 900 nm-1150 nm, 950 nm 1150 nm, 1000 nm-1150 nm, 1050 nm-1150 nm, 1100 nm-1150 nm, 600 nm-1100 nm, 650 nm-1100 nm, 650 nm-1100 nm, 700 nm-1100 nm, 750 nm 1100 nm, 800 nm-1100 nm, 850 nm-1100 nm, 900 nm-1100 nm, 950 nm-1100 nm, 1000 nm-1100 nm, 1050 nm-1100 nm, 600 nm-1050 nm, 650 nm-1050 nm, 700 nm-1050 nm, 750 nm-1050 nm, 800 nm-1050 nm, 850 nm-1050 nm, 900 nm-1050 nm, 950 nm-1050 nm, 1000 nm-1050 nm, 600 nm-1000 nm, 650 nm-1000 nm, 700 nm-1000 nm, 750 nm-1000 nm, 800 nm-1000 nm, 850 nm-1000 nm, 900 nm-1000 nm, 950 nm-1000 nm, 600 nm-950 nm, 650 nm-950 nm, 700 nm-950 nm, 750 nm 950 nm, 800 nm-950 nm, 850 nm-950 nm, 900 nm-950 nm, 600 nm-900 nm, 650 nm-900 nm, 700 nm-900 nm, 750 nm-900 nm, 800 nm-900 nm, 850 nm-900 nm, 600 nm-850 nm, 650 nm-850 nm, 700 nm-850 nm, 750 nm-850 nm, 800 nm-850 nm, 600 nm-800 nm, 650 nm-800 nm, 700 nm-800 nm, 750 nm-800 nm, 600 nm-750 nm, 650 nm-750 nm, 700 nm-750 nm 600 nm-700 nm, 600 nm-650 nm, or 650 nm-700 nm. Again however, it will be appreciated that other sensing wavelengths could be used depending on the preferred implementation and the nature of the feature being detected.

It will be understood that range of wavelengths encompasses the numerical values at each endpoint of the range. For example, a wavelength of between 600 nm and 900 nm is inclusive of a wavelength of 600 nm and a wavelength of 900 nm. Furthermore, where a range of values is provided, it is understood that each intervening value, to the tenth of the unit of the lower limit unless the context clearly dictates otherwise, between the upper and lower limit of that range and any other stated or intervening value in that stated range is encompassed within the range. The upper and lower limits of these smaller ranges may independently be included in the smaller ranges is also encompassed within the invention, subject to any specifically excluded limit in the stated range.

Where the stated range includes one or both of the limits, ranges excluding either both of those included limits are also included in the range.

In the current example, the optical fibre is a multimode optical fibre, allowing multiple transmission modes to be transmitted through a common core so that the optical fibre can transmit stimulating radiation to the target tissue and return sample radiation to the detector. The multimode fibre typically has a 110 µm diameter core, 125 µm diameter cladding, and an overall diameter of up to up to 250 µm with an outer polymer buffer, although other suitable arrangements could be used.

The apparatus typically includes a coupler 125 configured to couple the detector 122 and the radiation source 121 to the optical fibre 110. In this example, the coupler 125 is a multimode fibre coupler that transmits the laser light from a source optical fibre 121.1 extending from the radiation source 121 to the multimode fibre 112 and transmits sample radiation from the optical fibre 112 to a detector multimode optical fibre 122.2 extending to the detector. The multimode fibre allows efficient delivery of stimulating radiation and collection of sample radiation and is compatible with couplers that provide reasonably efficient separation of light between the delivery and collection paths as well as robust construction. The multimode fibre also allows efficient coupling of stimulating radiation to the fibre, although it will be appreciated that other arrangements could be used, and an example using a double clad optical fibre and associated coupler will be described in more detail below.

In use, the processing device 123 controls the radiation source 121, and analyses signals from the detector 122 allowing features within the subject to be identified. The processing device 123 may also be connected to an input device, such as a touchscreen, keypad, input buttons or the like, allowing operation of the reader to be controlled, for example to initiate a measurement process, connect the reader 120 to the output device 130, or the like.

The processing device 123 may also be connected to an interface 127 that can be utilised for connecting the processing device 123 to peripheral devices, such as a communications network, databases, other storage devices, output devices 130, remote devices, such as computer systems, smartphone, tablets, or the like. Although a single external interface 127 is shown, this is for the purpose of example only, and in practice multiple interfaces using various methods (e.g. Ethernet, serial, USB, wireless or the like) may be provided. In one preferred example, the interface 127 is used to allow the reader to connect wirelessly to the output device 130, although this is not essential and other arrangement could be used.

Additionally, and/or alternatively, operation of the reader 120 can be controlled by a remote device, such as a computer system, smartphone, tablet, or the like. In this instance, it will be appreciated that analysis of the results could also be performed, wholly or partly, in the remote device, reducing the amount of processing required within the reader, and that the output may be presented by the remote device, for example using an in-built display or similar. In this instance, the processing device 123 within the reader 120 typically performs minimal functions of controlling the radiation source 121 based on signals from the remote device and uploading signals from the detector 122 to the remote device for analysis. It will also be appreciated that any division of tasks between the processing device and remote device could be used depending on the preferred implementation.

In one example, the reflector includes a reflective surface coating, and in particular can include a conical inset with a reflective surface coating, although other arrangements such as an air gap between the conical surface and rest of the structure that allows for total internal reflection could be used. In the event a reflective surface is used, as imperfections in the surface can lead to scattering of stimulating and/or sample radiation, it is preferable to minimise imperfections to thereby maximise signal strength, and hence the ability to accurately detect features. Consequently, in one example, the conical insert is manufactured using two-photon stereolithography based on photopolymerization of a material including a photo-initiator and a monomer. The two-photon photo-initiator is a species, or a combination of chemicals able to efficiently absorb two photons to generate excited states from which radicals or ions can be created to initiate polymerization of the monomers. Example materials include acrylate monomers and photo-initiators such as 4,4'-dialkylamino trans-stilbene, bis-donor bis(styryl)benzene or bis(phenyl)polyene, fluorenes and ketocoumarins derivatives. The surface may also undergo laser polishing as an additional and/or alternative treatment step.

In one specific example, the reflector is manufactured using an ORMOSIL polymer (ORganic MOdified SILicate, SZGel, SZ2080 Silica-Zirconia Hybrid). This can be used in a non-photosensitized form in order to avoid negative effects of the photoinitiator on optical performance, but it can also include a photosensitizer, Irgacure 369 photoinitiator. ORMOSIL can provide improved dimensional stability compared to other approaches. Avoiding photoinitiators is also preferable for medical devices as the initiators generate free radicals and may contribute to cytotoxicity, although this may not be required given that the reflector can be encapsulated.

Figure 3A:
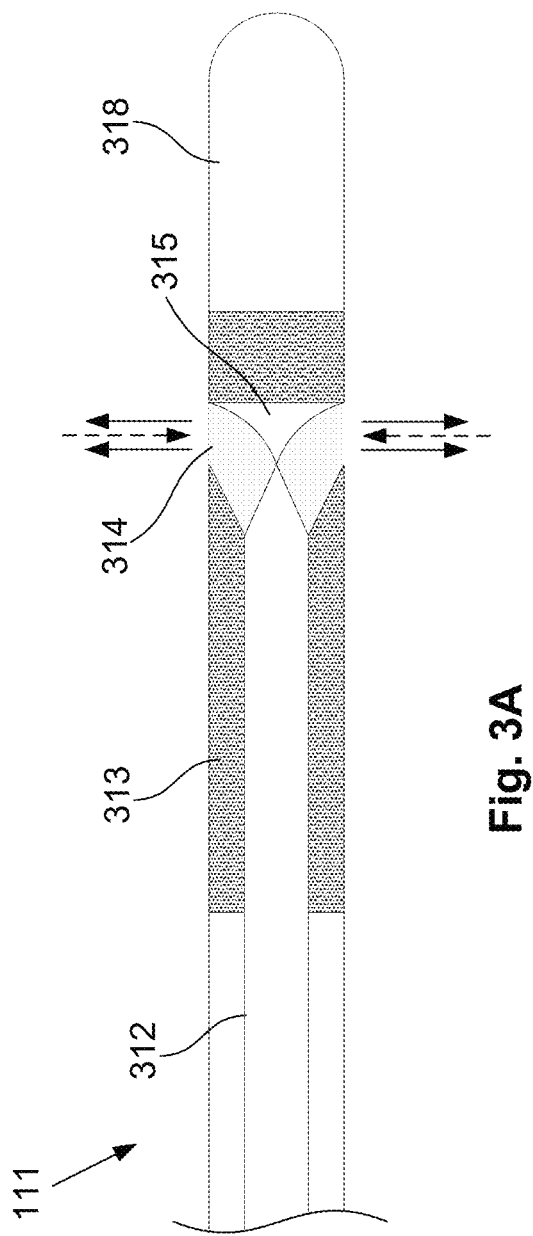
FIG. 3A is a schematic diagram of an alternative example of a tip of the guidewire of FIG. 1A.

The conical reflector can have a surface that is a flat conical surface, similar to that shown in FIG. 1B. In this example, the flat conical surface has a radius that increases at a constant rate in an axial direction. An arrangement of this form generates an annular radiation beam having a substantially constant longitudinal width. However, this is not essential, and the conical surface could be a curved conical surface, and an example of this is shown in FIG. 3A.

In this example, similar reference numerals increased by 200 are used to denote similar features to the arrangement of FIG. 1B, and these will not therefore be described in detail.

Thus, the guidewire includes a circumferential window 314, with an optical fibre 312 extending substantially from a proximal end of the guidewire to a position proximate the conical reflector 315.

In this example, the conical reflector 315 is inwardly curved (horn shaped) to focus the stimulating radiation beam more tightly, thus reducing the spread of the stimulating radiation on the tissue and increasing spatial resolution, and assisting with focusing sample radiation onto the facet of the optical fibre 312. In this example, the window 314 is also extended in a longitudinal direction to allow more sample radiation to enter the window 314, with this being focused onto the optical fibre 312 to thereby increase the magnitude of the sample radiation received, which in turn helps improve the signal strength of the detected sample radiation. In order to achieve a significant increase in the amount of collected light, it is preferable to extend the reflector beyond the diameter of the optical fibre, so that the reflector has a diameter that is greater than that of the optical fibre. This can be used to maximise the signal strength of the detected sample radiation, which can help with ensuring weak autofluorescence is detected, and can be distinguished from background radiation. It will be noted that such arrangements are incompatible with the catheter based arrangements of the prior art.

In one example this involves using a substantially parabolic profile and/or a curved conical surface configured to collimate stimulating radiation, and ensure even exposure of the blood vessel wall irrespective of the separation between the blood vessel wall and the reflector. However, it will be appreciated that an outwardly curved (hemi-ellipsoidal shaped) reflector could be used if it is desired to disperse the stimulating radiation more widely. In practice, tapering of the conical reflector in this manner can be performed using the two photon polymerisation process described above.

The combination of an increased mirror diameter and curvature of the conical surface leads to an increase in the collection efficiency of at least 100% compared to a flat conical surface, which in turn can help ensure sample signals resulting from autofluorescence within the artery are detectable over background radiation resulting from other emissions and reflections within the artery.

Figure 3B:
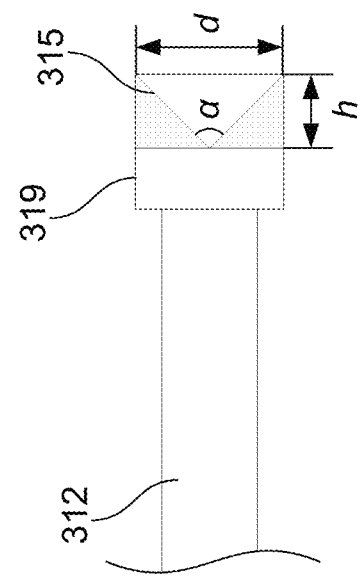
FIG. 3B is a schematic close up view of an alternative example of a conical reflector.

Another example reflector configuration will now be described with reference to FIG. 3B.

In this example, the conical reflector 315 has a diameter d that is larger than the diameter of the optical fibre 312, which as mentioned above helps with increasing the signal strength of the detected sample radiation. In this example, an expansion region 319 is provided between an end of the optical fibre 312 and the conical reflector 315, to allow the beam to expand through diffraction, and which also assists with focusing sample radiation reflected back from the reflector onto the optical fibre. In this example, a distal end of the expansion region 319 is the same diameter as the conical reflector, whilst a proximal end can have a diameter equal or greater than the diameter of the optical fibre 312.

Figure 7A:
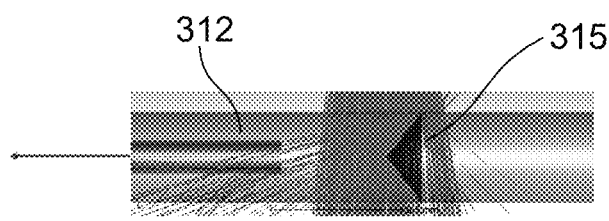
FIGS. 7A to 7C are schematic diagrams of examples of ray tracing simulations for conical reflectors having progressively increasing numbers of surface elements to approximate an concave curved conical reflector.
Figure 7D:
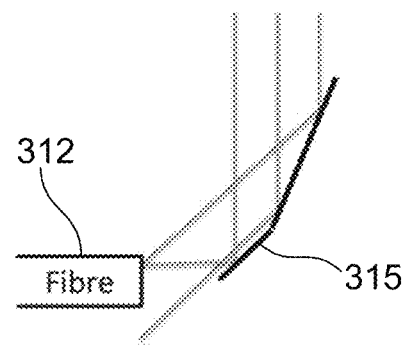
FIGS. 7D to 7F are schematic diagrams of examples of the surface elements to approximate an concave curved conical reflector for the ray tracing simulations of FIGS. 7A to 7C, respectively.
Figure 7B:
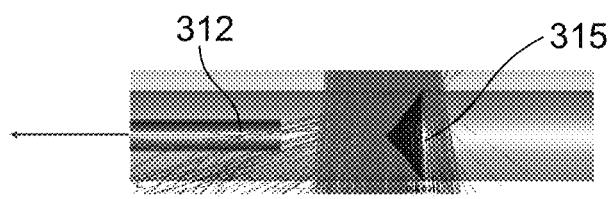
Figure 7E:
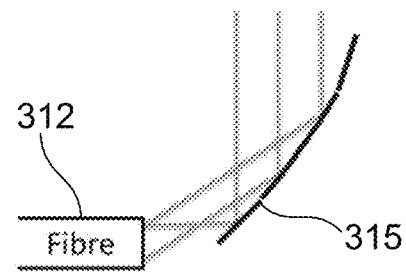
Figure 7C:
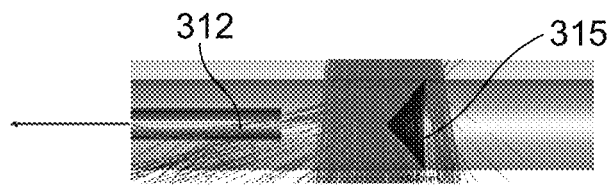
Figure 7F:
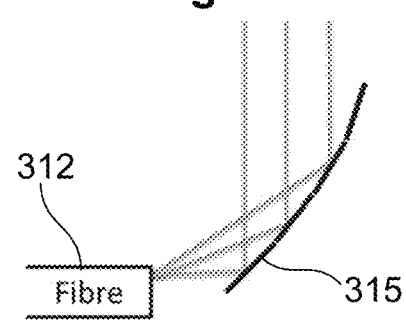

Ray tracing simulations were used to demonstrate how the combination of an increased mirror diameter and curvature of the conical surface leads to an increase in the collection efficiency. In this regard, FIGS. 7A to 7C show example ray traces for the corresponding reflector arrangements of FIGS. 7D to 7F, in which progressively increasing numbers of surface elements are used to approximate a curved conical reflector. These simulations show how the number of photons captured by the optical fibre increases as the number of surface elements approximating the ideal curved mirror surface is increased. The received power at the detector is effectively doubled for the case of four elements, compared to the reference case of a single cone angle. In the simulation the rays all originate from the same point source on the wall of the blood vessel (positioned above the segment of the optical system shown in these examples), but have randomly selected angles of propagation that cover a wider range than that subtended by the mirror. FIGS. 7D to 7F provide a simplified 2D illustration of the cone surface relative to the fibre end face. Only the upper half of the cone cross section is shown here for convenience.

Further, the presence of a beam expansion section of appropriate length can be used to allow for enhanced convergence on the end face of the optical fibre. In this regard, FIGS. 7G to 7I show the effect of progressively increasing beam expansion sections, with a resulting return power of sample radiation being shown in FIG. 7J. This highlights that a beam expansion region having a length of between 0.3 mm to 0.5 mm and preferably 0.4 mm, results in optimum return power for the sample radiation, although it will be appreciated that this value may vary depending on the diameter, cone angle and curvature of the reflector, as well as the numerical aperture of the optical fiber.

Together these simulations demonstrate substantial improvements in light collection efficiency can be obtained by increasing the diameter of the mirror, curving the mirror surface, and selecting an appropriate beam expansion length.

In general, the reflector 315 would typically have a diameter d of at least 80 μm, which corresponds to the smallest "standard" diameter optical fibres that would practically be used in the guidewire. The maximum diameter of the reflector 315 would typically be constrained by the diameter of the guidewire, and would be up to 350 μm. The height h of the conical reflector 315 would be approximately half the cone diameter d for a flat conical surface, with slightly larger or smaller values possible if using a curved or parabolic shaped reflector.

Figure 8:
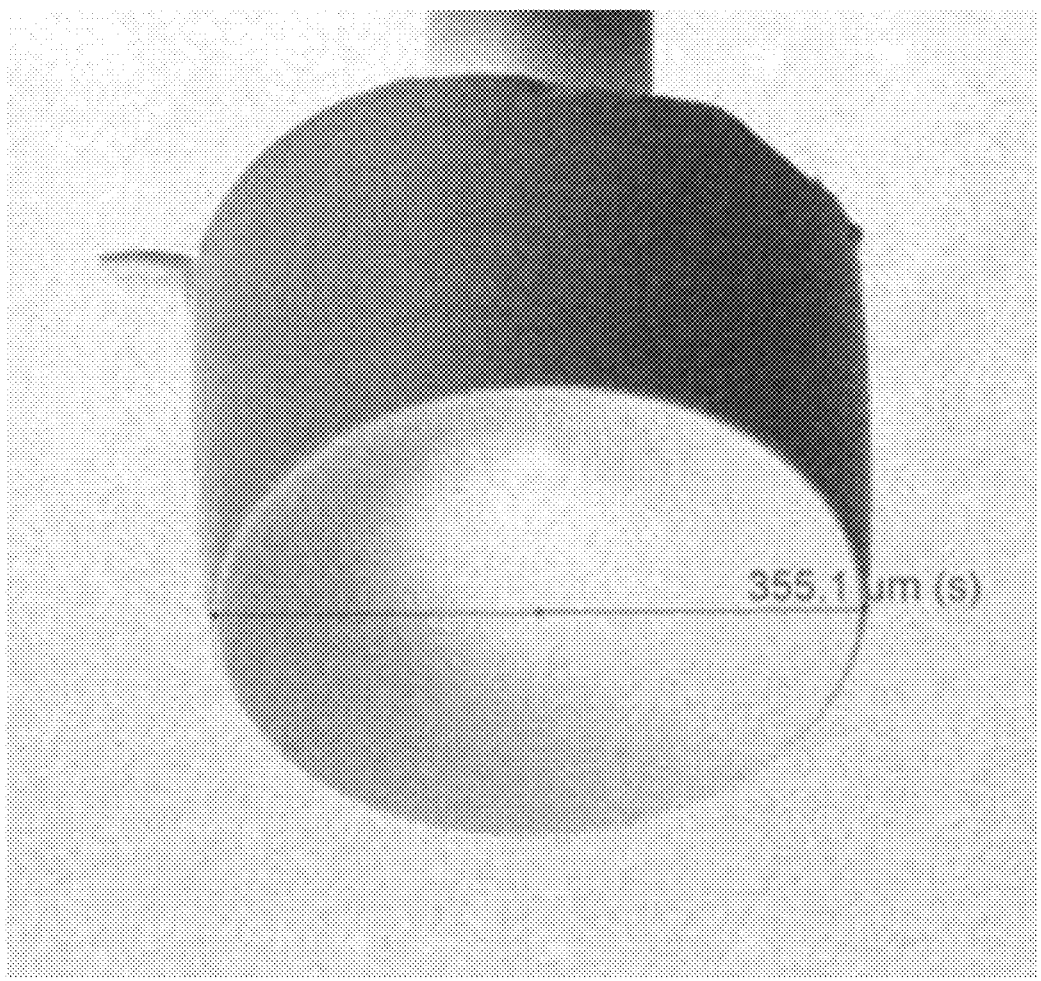

A specific example of a manufactured reflector is shown in FIG. 8.

Additionally, a cone angle α can determine the angle at which the light emerges from the guidewire. In one example, this could be a 90° degree cone angle, resulting in emission substantially perpendicular to a longitudinal axis of the guidewire. However, other angles could be used depending on the preferred implementation, for example to allow more relaxed manufacturing tolerances, or different levels of spatial resolution along the arterial wall.

In one particular example, the reflector is configured so that stimulating radiation is emitted from the optical fibre at an angle offset to 90°. This avoids emitted sampling radiation being reflected straight back from the vessel wall onto the reflector, and hence being detected as sample radiation, which could swamp signals resulting from autofluorescence within the vessel. Consequently, cone angles between 45° and 135°, could be used, and in one example, cone angles are used that are offset from 90° and more preferably offset from 85° to 95°.

Typically, the reflectors 115, 315 are configured to generate annular beams of stimulating radiation having a longitudinal width of at least one of greater than 10 μm, greater than 50 μm, less than 200 μm or about 100 μm, although it will be appreciated that other widths could be used, depending on the preferred implementation.

In the above described example, a multimode optical fibre is used. However, this is not essential and alternatively a double clad optical fibre could be used, and an example of this will now be described with reference to FIGS. 4A to 4C.

In this example, similar reference numerals increased by 300 are used to denote similar features to the arrangement of FIG. 1B, and these will not therefore be described in detail.

Thus, the guidewire includes a circumferential window 414, and a conical reflector 415 positioned radially inwardly of the window 414, and rearwardly of the tip 418. In this example, a double clad optical fibre 412 extends substantially from a proximal end of the guidewire to a beam expander 419 positioned proximate the conical reflector 415. Again, the distal end of the optical fibre 412, the beam expander 419 and conical reflector 415 are held in position by a supporting material 413, such as silicone potting.

The double clad optical fibre 412 includes a single mode core 412.1, a first multimode cladding layer 412.2 and a second outer cladding layer 412.3. The single mode core 412.1 and first multimode cladding layer 412.2 have a diameter of 125 μm or less, whilst the overall diameter of the optical fibre is up to 250 μm including the polymer outer cladding layer 412.3.

In use, the single mode core 412.1 is used to propagate stimulating radiation from the radiation source 121, whilst the multimode cladding layer 412.2 is used to transmit sample radiation back to the detector 122. In this example, the beam expander 419 includes a standard multimode fibre similar to that described above, spliced to the end of the double clad fibre 412. The beam expander 419 operates to allow the single mode laser light to expand through diffraction so that the beam of stimulating radiation matches the size of the radial reflector. The size of the beam expander 419 will depend on the desired spatial extent on the lumen and the diameter of the reflector available for collecting the sample radiation but typically is approximately up to 1.5 mm in length.

In this example, the reader 120 includes a double clad fibre coupler 125 that transmits stimulating radiation from a single core single mode source optical fibre 121.1 to the inner core 412.1 and transmits backscattered sample radiation from the inner cladding 412.2 of the double clad fibre to a multimode detector optical fibre 122.2.

The use of a double clad fibre 412 allows efficient delivery of stimulating radiation and collection of backscattered sample radiation. The double core fibre 412 is also compatible with fibre couplers 125 that provide efficient separation of light between the delivery and collection paths as well as having a robust construction.

In this example, the beam expander 419 plays an important role in adapting the double core fibre to radial emission and collection of signal, primarily by ensuring that the largest possible extent of sample radiation is collected by the surface of the conical reflector and directed back into the inner core of the fibre. Additionally, the beam expander ensures that the small spatial source of stimulating radiation can be efficiently reflected and potentially focused into an annular beam of stimulating radiation that is emitted from the entire circumference of the guidewire 110.

Again, in this example, the radial reflector 415 could be flat or curved, but in any event, provides a well-defined spatial location (along the longitudinal axis of the vessel) for detection of sample radiation, such as autofluorescence, and in principle the spatial resolution should be better than that obtained with a multimode fibre, due to the smaller source size that can be focused into a narrower annular beam.

Whilst the above examples have focused on the use of multimode or double clad optical fibres, it will be appreciated that other forms of fibres could be used, such as microstructured optical fibres, photonic crystal fibres, or the like, and that reference to multimode or double clad optical fibres should not be considered limiting.

In the above described examples, the reader includes a single detector 122 configured to detect sample radiation. However, the intensity of received sample radiation can vary depending on a number of factors, including the presence of features, as well as scattering of radiation within the blood vessel. For example, stimulating and sample radiation is likely to be strongly scattered in blood. In one example, such scattering can be accommodated by monitoring the separation of the guidewire from the blood vessel wall, for example using techniques similar to those described in U.S. Pat. No. 7,539,530B2, the contents of which are incorporated herein by cross reference. Additionally, and/or alternatively, it may be necessary to flush blood away from the measurement window during the measurement, which can be achieved using a contrast agent that is used to visualise the arteries, such as VISIPAQUE™.

Figure 5:
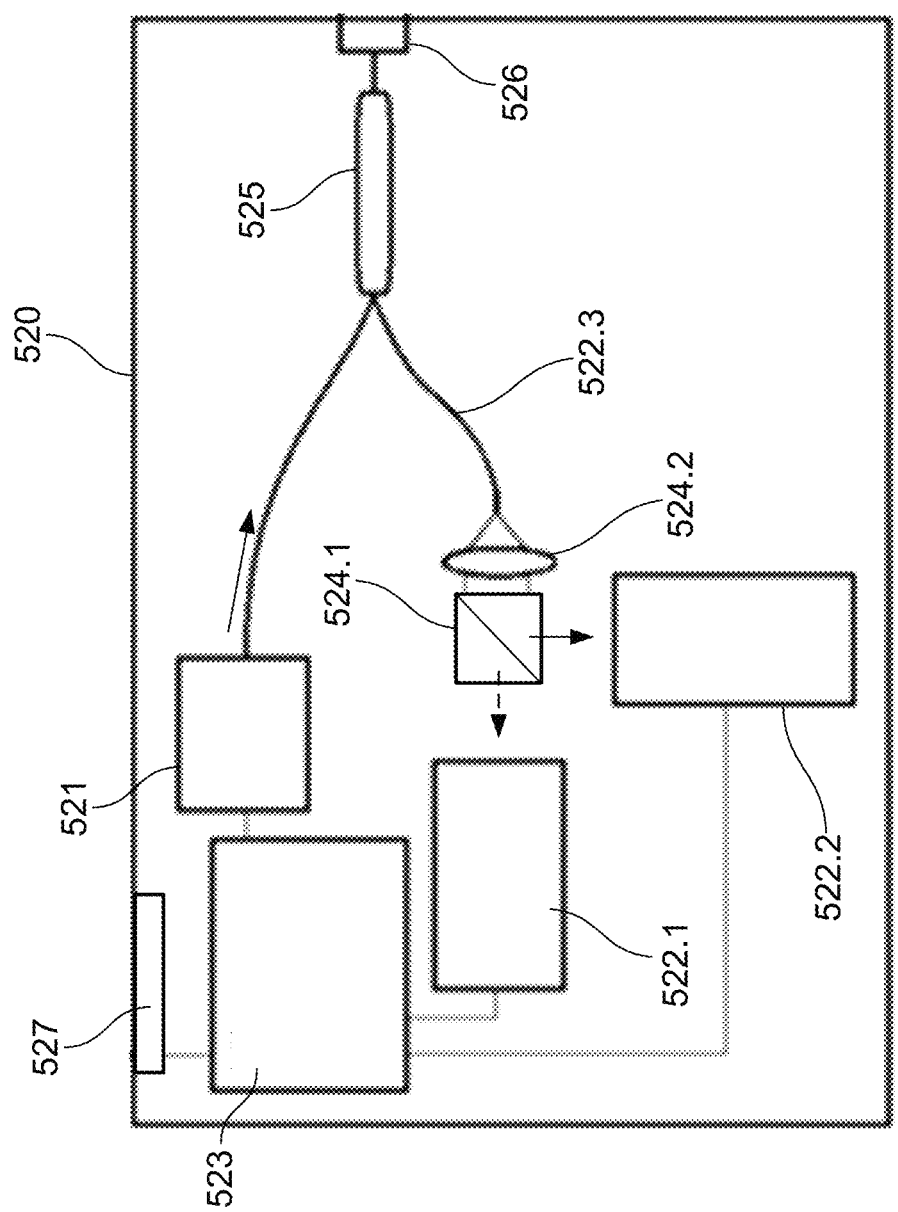
FIG. 5 is a schematic diagram of an alternative example of a reader for a sensing apparatus for performing sensing in a blood vessel of a biological subject.

In a further alternative, a second detector is provided for detecting backscattered stimulating radiation, allowing this to be used to calibrate the measurement of the received sample radiation and an example of this is shown in FIG. 5.

In this example, similar reference numerals increased by 400 are used to denote similar features to the arrangement of FIG. 1A, and these will not therefore be described in detail.

Thus, in this example, the reader 520 includes a radiation source 521, source optical fibre 521.1, processing device 523, fibre coupler 525, connector 526, interface 527 and optional input 528. The single detector of FIG. 1A is replaced with first and second detectors 522.1, 522.2, which are coupled to the detector optical fibre 522.3, via a filter/beam splitter arrangement 524.1 and lens 524.2, which operates to split incoming radiation into sample radiation and backscattered stimulating radiation to the first and second detectors 522.1, 522.2 respectively. This allows the backscattered stimulating radiation to be used to calibrate a received intensity of sample radiation, for example, by using a ratio of the stimulating and sample radiation to be used so that analysis takes into account the amount of scattering that occurs within the blood vessel. For example, the ratio might account for changes in a size of the vessel, which introduces a $1/R^2$ factor (where R is the blood vessel radius).

Background signals may also arise from Raman scattering generated from the silica glass inside the optical fibres. In this example, a microfilter arrangement, similar to that described in copending application US2021/0041366 could be employed to remove such Raman scattering from double clad optical fibres. In this example, the filter arrangement could be integrated as part of the beam expander 419 in the double clad fibre arrangement described above with reference to FIGS. 4A to 4C.

Alternatively, in another example, an intensity of background radiation at a third wavelength can be measured, which represents background radiation emitted from other tissue components illuminated by the annular beam, such as fluorescence or autofluorescence emitted from healthy tissue and/or stable plaques, or the like. In this case, the signal of interest can be a ratio between the sample radiation and the background radiation. In one example, any NIRAF signal due to unstable plaque will be clinically significant, so the threshold for detection will be determined by the noise level in the background signal. For example, if the variability in the intensity of background radiation is 10%, then the ratio could be required to be larger than 1.3 to signify an event (corresponding to SNR>3 as a threshold).

The processing device 523 is typically configured to analyse the received sample radiation by determining a characteristic of the sample radiation and using this to assess whether or not the sample radiation is indicative of a presence or absence of a feature. For example, a feature may emit radiation at a characteristic frequency, in which case detection of sample radiation at that frequency can be used to identify that a feature is present.

In one particular example, the processing device 523 is configured to analyse the sample radiation by determining a sample radiation characteristic, such as a measured intensity of sample radiation, a value derived from a measured intensity of sample radiation or a change in a measured intensity of sample radiation. The sample radiation characteristic is then used to identify if a feature is present in the blood vessel, in which case an indicator is generated if a feature is present.

Thus, for example, an intensity of the sample radiation at a particular wavelength can be used to assess if a feature, such as a vulnerable atherosclerotic plaque, is present. In this example, the processing device typically determines an intensity of the sample radiation based on signals received from the detector, and then compares the intensity to a threshold. If the intensity of the sample radiation exceeds a threshold, this can be indicative of a presence of the feature, and/or quantification of the feature, such as a degree of vulnerability of the atherosclerotic plaque. The threshold could be an absolute value, such as a value derived from analysis of multiple features, but could alternatively be a relative value, and/or could be derived based on measurements of background radiation or backscattered stimulating radiation.

This in turn allows a corresponding indication to be generated, for example, generating an audible, tactile and/or visual alert or optionally display a spectrum of the received sample radiation. In one example, a numerical indicator could be displayed that represents a risk associated with any detected feature, for example using a scaled value between 1 and 10 to indicate a degree of risk. In this regard, the intensity of the received signal might depend on a size and/or degree of intraplaque haemorrhage, so that a higher intensity of received signal means either a larger or more vulnerable plaque, either of which represents a greater risk to the subject, allowing an intensity to be scaled to provide such an indicator.

Additionally, and/or alternatively, a change in intensity determined as the guidewire is moved could be used to compare a part of the blood vessel that is healthy, to a part of the blood vessel containing a feature. Thus, for example, there will be a stepwise change in an intensity of detected sample radiation as the guidewire is moved from a region of healthy blood vessel, to a part of the vessel containing a vulnerable atherosclerotic plaque. In one example, a degree of change, such as a ratio of sample radiation from a healthy portion of the blood vessel and a portion containing a feature, can be used to assess the presence of the feature.

It will be appreciated that the rate of movement of the guidewire within the vessel may "blur" the spatial resolution. However, adjusting a sampling rate in terms of a detection threshold can be used to account for this, for example, using small signals to provide a fast sampling rate. However, this will lead to higher noise levels and thus reduced sensitivity, and vice versa for slower sampling, meaning that the process may need to trade-off sampling rate, spatial resolution and sensitivity. Additionally, this may need to be adjusted to take into account changes in the diameter of the vessel, the presence of stable plaque, or other factors. Thus, in one example, the system may use additional data, such as an expected vessel diameter, in order to control signal sampling, and signal thresholds, thereby optimising the analysis performed to the current scenario. Additionally and/or alternatively, further processing may be required, for example using a spatial rate of change in intensity that can take into account speed of movement of the guidewire through the blood vessel.

As previously mentioned, different amounts of scattering might occur in the blood vessel, in which case measures of backscattered stimulating radiation can be used when analysing the sample radiation. For example, a measured intensity of backscattered stimulation radiation can be used to normalise a measured intensity of sample radiation, or alter a threshold used when analysing the sample radiation. For example, if a measured intensity of backscattered stimulating radiation increases, this implies additional scattering is occurring, and hence a threshold required to identify a presence of a feature could be modified. In this regard, the threshold could be a specific value of a measured indicator, such as a ratio of the intensity of sample radiation measured from a feature versus background radiation from healthy tissue, or the like.

It will be appreciated that in practice the approach used may depend on a range of factors, such as the nature of the feature, the environment within the blood vessel, or the like. In one example, to best account for this, an approach is to measure the entire spectrum i.e. intensity at many wavelengths. This can then be analysed using multivariate techniques and/or machine learning approaches, allowing feature detection to be performed using the most appropriate technique.

As mentioned above, the apparatus can include an output, such as a display device, computer monitor, touchscreen, tablet, speakers, or the like, which can be configured to generate audible, visual or tactile output indicative of the indicator. For example, a monitor or display can be used to display an intensity map derived from the measured sample radiation. This could be further registered against the position of the radiopaque tip and projected over a corresponding region of a fluoroscopy image, allowing a clinician to visualise the location of any features. Additionally, and/or alternatively, other forms of data presentation could be used, such as an audible signal, which has the benefit of allowing the clinician to identify a feature without having to observe a screen, which can distract them from managing the guidewire.

Figure 6A:
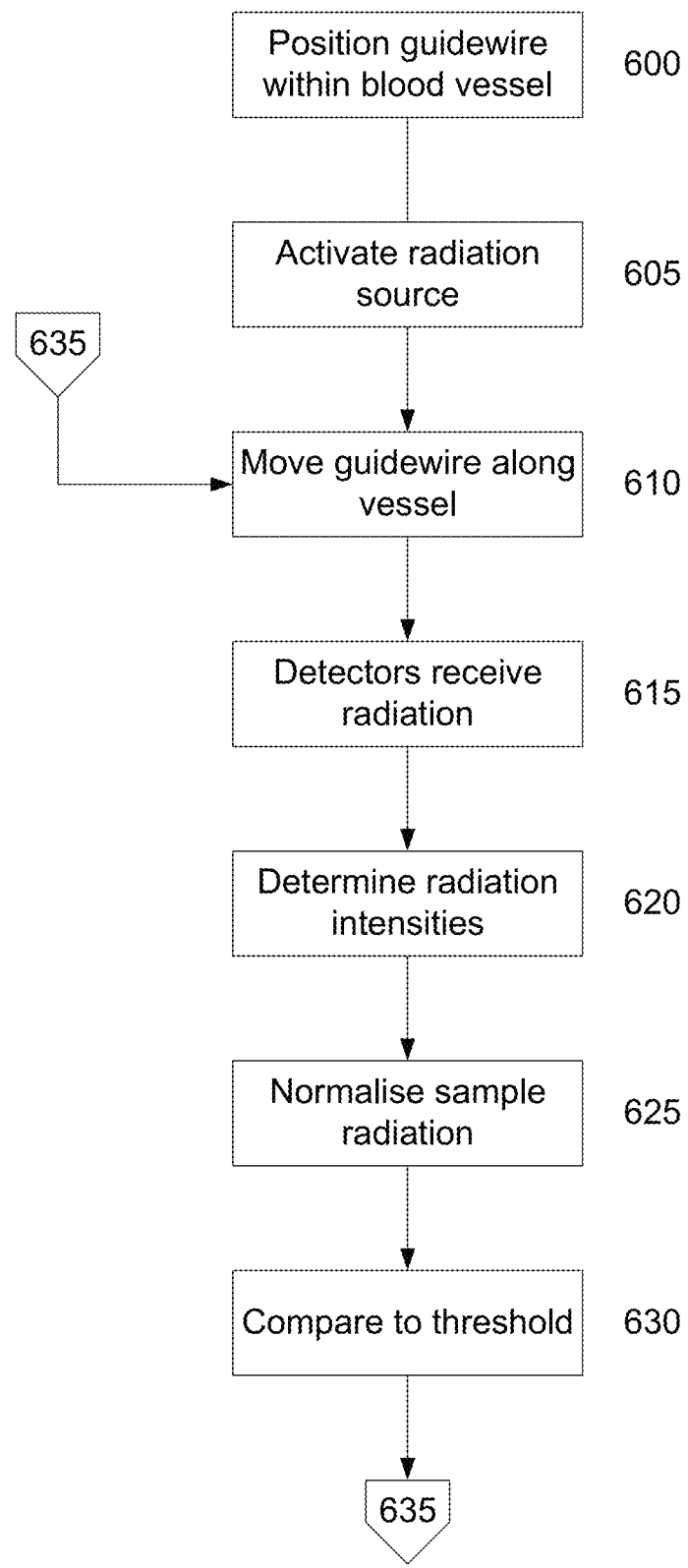
FIGS. 6A and 6B are a flow chart of a specific example of a method for performing sensing in a blood vessel of a biological subject.
Figure 6B:
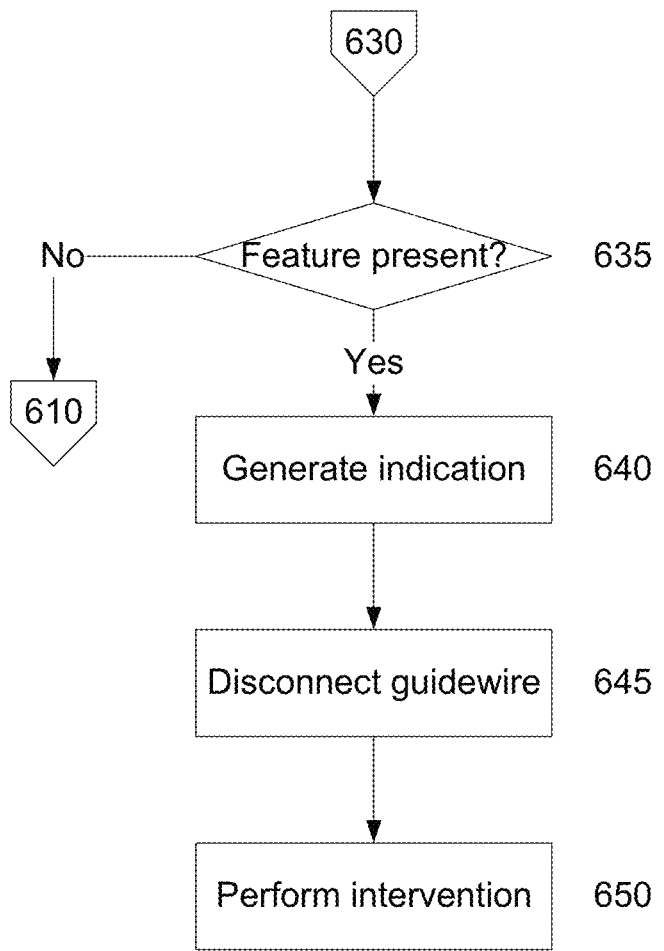

An example of a preferred process for performing sensing of a feature will now be described with reference to FIGS. 6A and 6B. For the purpose of illustration, the example will be described with reference to the apparatus of FIG. 5, although it will be appreciated that a broadly similar process can be performed using the other apparatus arrangements described herein.

In this example, at step 600, an operator inserts the guidewire 110 into the blood vessel of a subject, and initiates a measurement procedure using the input 528 to thereby cause the processing device 523 to activate the radiation source 521 at step 605.

At this point, the operator begins moving the guidewire along the vessel at step 610, for example by retracting the guidewire so that it passes through a part of the blood vessel at risk of containing features such as vulnerable atherosclerotic plaques.

At step 615 radiation is received by the first and second detectors 522.1, 522.2, with signals from the detectors being used by the processing device 523 to determine an intensity of sample radiation and backscattered stimulating radiation and/or background radiation at step 620. At step 625 the processing device 523 is used to normalise the intensity of the sample radiation, based on the intensity of the backscattered stimulating radiation. This attempts to adjust the magnitude of the intensity of the sample radiation to take into account the amount of scattering in the blood vessel, which could in turn influence the intensity of the received sample radiation.

In one example, the above approach detects any sample radiation that is significantly higher in intensity than the intensity of detected background radiation emitted from healthy tissue, or the like. The simultaneous measurement of background radiation allows variations in vessel diameter and tissue characteristics to be taken into account. Additionally and/or alternatively, the intensity of measured sample radiation could be compared to a composite reading based on the measured intensity of background radiation including autofluorescence from healthy tissue and/or stable plaque, combined with measurements of the intensity of backscattered stimulating radiation.

At step 630, the normalised sample radiation intensity is compared to a threshold, with results of the comparison being used by the processing device 523 to ascertain if a feature is present in the blood vessel. If not, the process returns to step 610, with the operator continuing to move the guidewire along the blood vessel.

However, if a feature is present, an indication is generated and presented at step 640, for example, by updating the display and/or sounding an alert. This allows the operator to disconnect the guidewire from the reader at step 645, allowing the operator to commence an intervention at step 650.

It will be appreciated that the above described process can be performed substantially continuously, so that in practice the guidewire does not need to be held statically within the blood vessel and instead detection can be performed substantially continuously as the guidewire is moved within the blood vessel. This therefore provides an easy, effective, and timely mechanism in order to identify features within a blood vessel.

The above described approach can be used to perform detection of features in a wide range of circumstances. This tends to be most useful in circumstances where the sample radiation is emitted as a result of fluorescence, for example due to exogenous fluorescence or autofluorescence arising from fluorescence of the feature without additional exogenous markers. In one preferred arrangement, the apparatus is configured to detect sample radiation emitted from an atherosclerotic plaque within the blood vessel, with the resulting indicator being indicative of a presence, or degree or vulnerability, of the plaque.

The above approach provides a device that has the flexibility and small size to be deployed as a guidewire, allowing this to be employed more straightforwardly, and which can be used to perform spectroscopic measurements of low level light signals, i.e. measurements of the intensity of light at different wavelengths.

Another form of spectroscopy that has been evaluated for intravascular spectroscopic measurements is near-infrared reflectance spectroscopy, which we have described in Par. 12. The InfraReDx NIR spectroscopy system consists of a 3.2F imaging catheter (1.07 mm diameter) with mechanical pullback and rotation. The catheter contains a rotating core and with optical fibres that deliver and collect NIR light, as well as a sealed outer sheath with a guidewire provision (described in Waxman S, "Near infrared spectroscopy for plaque characterization," J Interv Cardiol 2008, 21:452-458). The use of multiple optical fibres is generally incompatible with a standard coronary guidewire size of 350 μm. NIR spectroscopy would not normally be considered a low light level technique as it is based on reflected light levels. However, if the measurements are conducted in blood rather than relying on vessel flushing, vessel occlusion, or tissue apposition, then the signal level will be degraded. Thus the longitudinal pullback speed is restricted to 0.5 mm/s.

Based on these examples of spectroscopic measurements of low light level signals, which are all currently implemented in catheters or endoscopic devices with relatively large diameters, it is apparent that these spectroscopic techniques could not be practically implemented in a guidewire with any of the devices disclosed in the prior art discussed above, because those patents do not show how to (a) miniaturise the device to the scale of standard coronary guidewires, and (b) provide sufficient collection efficiency for the levels of sensitivity (and thus scanning speed) required in practical applications.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the terms "approximately" or "about" mean±20%.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. A sensing apparatus for performing sensing in a blood vessel of a biological subject, the sensing apparatus including:
   a) a guidewire including:
      i) a circumferential window positioned proximate a distal end, the guidewire being configured to be positioned in the blood vessel of the biological subject;
      ii) an optical fibre extending from a proximal end of the guidewire to a position proximate the window; and,
      iii) a conical reflector positioned proximate the window and aligned with an axis of the optical fibre, the conical reflector being configured to:
         (1) reflect stimulating radiation emitted from the optical fibre so that the stimulating radiation passes radially through the window to thereby expose the blood vessel to the stimulating radiation; and,
         (2) reflect sample radiation emitted from within the blood vessel so that the sample radiation is transmitted to the optical fibre; and,
   b) a radiation source coupled to the optical fibre and configured to emit stimulating radiation via the optical fibre;
   c) a detector configured to detect sample radiation received via the optical fibre; and,
   d) one or more processing devices configured to:
      i) analyse the detected sample radiation; and,
      ii) generate an indicator indicative of results of analysis of the detected sample radiation.

2. A sensing apparatus according to claim 1, wherein at least one of the reflector and a distal end of the optical fibre are embedded in a supporting material.

3. A sensing apparatus according to claim 1, wherein the reflector at least one of:
   a) includes a reflective surface coating;
   b) includes at least one of:
      i) a curved conical surface;
      ii) a curved conical surface configured to collimate stimulating radiation;
      ill) an at least partially parabolic surface; and,
      iv) a flat conical surface;
   c) has a diameter greater than that of the optical fibre;
   d) is configured so that stimulating radiation is emitted from the optical fibre at an angle offset to 90°;
   e) has a cone angle that is:
      i) between 45° and 135°; and,
      ii) offset from 90°; and,
   f) is configured to generate an annular beam of stimulating radiation having a longitudinal width of at least one of:
      i) greater than 10 μm;
      ii) greater than 50 μm;
      iii) less than 200 μm; and,
      iv) about 100 μm.

4. A sensing apparatus according to claim 1, wherein the optical fibre is at least one of:
   a) a multimode optical fibre;
   b) a double clad optical fibre; and,
   c) is a double clad optical fibre and the apparatus includes a beam expander coupled to a distal end of the double clad fibre, the beam expander being configured to allow the stimulating radiation to expand through diffraction so that a beam of the stimulating radiation has a diameter similar to or smaller than a diameter of the reflector, wherein the beam expander includes a multimode fibre spliced to the double clad optical fibre.

5. A sensing apparatus according to claim 1, wherein the radiation source at least one of:
   a) includes a laser diode; and,
   b) generates radiation in the range 600 nm to 900 nm.

6. A sensing apparatus according to claim 1, wherein the apparatus includes a filter configured to filter sample radiation before the sample radiation reaches the detector, and wherein the filter is a longpass filter configured to at least one of:
   a) transmit radiation having a wavelength greater than the wavelength of the stimulating radiation;
   b) transmit radiation having a wavelength of 20 nm or more greater than the wavelength of the stimulating radiation; and,
   c) suppress stimulating radiation.

7. A sensing apparatus according to any one of the claim 1, wherein the apparatus includes at least one of:
   a) a coupler configured to couple the detector and the radiation source to the optical fibre;
   b) a reader including at least the detector and radiation source;
   c) a connector that physically decouples the optical fibre from a reader; and,
   d) a second detector configured to detect backscattered stimulating radiation.

8. A sensing apparatus according to claim 1, wherein the guidewire includes at least one of:
   a) a metal sheath that is flexible in a transverse direction, but stiff in a longitudinal direction and under rotational movement about a longitudinal axis;
   b) a radiopaque atraumatic tip;
   c) a shapeable section at a distal end;
   d) a working length of at least one of:
      i) 1.5 to 2.0 m;
      ii) 1.75 to 1.9 m; and,
      iii) approximately 1.85 m; and,
   e) an outer diameter of at least one of:
      i) 300 μm to 400 μm;
      ii) 325 μm to 375 μm; and,
      iii) approximately 350 μm.

9. A sensing apparatus according to claim 1, wherein one or more processing devices are configured to analyse the sample radiation by:
   a) determining a sample radiation characteristic based on signals received from the detector, wherein the sample radiation characteristic is indicative of at least one of:
      i) a measured intensity of sample radiation;
      ii) a value derived from a measured intensity of sample radiation; and,
      iii) a change in a measured intensity of sample radiation
   b) using the sample radiation characteristic to identify if a feature is present in the blood vessel; and,
   c) generate an indicator if a feature is present.

10. A sensing apparatus according claim 1, wherein the one or more processing devices are configured to analyse the sample radiation by:
    a) determining an intensity of sample radiation based on signals from the detector;
    b) comparing the intensity to a threshold; and,
    c) generating the indicator if the intensity exceeds the threshold.

11. A sensing apparatus according to claim 1, wherein the apparatus includes an output configured to generate an at least one of:
    a) tactile feedback;
    b) an audible output indicative of the indicator; and,
    c) a visual output indicative of the indicator.

12. A sensing apparatus according to claim 1, wherein the sample radiation is emitted at least one of:
    a) as a result of at least one of:
       i) Raman scattering;
       ii) fluorescence; and,
       iii) autofluorescence; and
    b) from a plaque within the blood vessel.

13. A sensing apparatus according to claim 1, wherein the indicator is indicative of at least one of:
    a) a presence of a vulnerable atherosclerotic plaque; and,
    b) a degree of vulnerability of a vulnerable atherosclerotic plaque.

14. A sensing method including:
    a) positioning a guidewire in a blood vessel of a biological subject, the guidewire including:
       i) a circumferential window positioned proximate a distal end of the guidewire;
       ii) an optical fibre extending from a proximal end of the guidewire to a position proximate the window; and,
       iii) a conical reflector positioned proximate the window and aligned with an axis of the optical fibre, the conical reflector being configured to:
          (1) reflect stimulating radiation emitted from the optical fibre so that the stimulating radiation passes radially through the window to thereby expose the blood vessel to the stimulating radiation; and,
          (2) reflect sample radiation emitted from within the blood vessel so that the sample radiation is transmitted to the optical fibre;
    b) using a radiation source coupled to the optical fibre to emit stimulating radiation via the optical fibre;
    c) using a detector to detect sample radiation received via the optical fibre; and,
    d) using one or more processing devices to:
       i) analyse the detected sample radiation; and,
       ii) generate an indicator indicative of results of analysis of the detected sample radiation.

15. A method according to claim 14, wherein the method includes at least one of:
    a) moving the guidewire within the blood vessel; and,
    b) in the one or more processing devices, analysing the sample radiation by:
       i) determining a sample radiation characteristic based on signals received from the detector, wherein the sample radiation characteristic is indicative of at least one of:
          (1) a measured intensity of sample radiation;
          (2) a value derived from a measured intensity of sample radiation; and,
          (3) a change in a measured intensity of sample radiation;

ii) using the sample radiation characteristic to identify if a feature is present in the blood vessel; and, iii) generating an indicator if a feature is present.

16. A method according to claim 14, wherein the method includes:
   a) moving the guidewire within the blood vessel until an indicator is generated; and,
   b) identifying a location of a vulnerable atherosclerotic plaque based on a position of the guidewire.

17. A method according to claim 14, wherein the method includes, in response to output of an indicator:
   a) disconnecting the guidewire from the reader;
   b) inserting a catheter into the blood vessel over the guidewire; and,
   c) performing an intervention using the catheter.

18. A guidewire for a sensing apparatus for performing sensing in a blood vessel of a biological subject, the guidewire including:
   a) a circumferential window positioned proximate a distal end, the guidewire being configured to be positioned in the blood vessel of the biological subject;
   b) an optical fibre extending from a proximal end of the guidewire to a position proximate the window; and,
   c) a conical reflector positioned proximate the window and aligned with an axis of the optical fibre, the conical reflector being configured to:
      i) reflect stimulating radiation emitted from the optical fibre so that the stimulating radiation passes radially through the window to thereby expose the blood vessel to the stimulating radiation; and,
      ii) reflect sample radiation emitted from within the blood vessel so that the sample radiation is transmitted to the optical fibre.

19. A guidewire according to claim 18, wherein at least one of the reflector and a distal end of the optical fibre are embedded in a supporting material.

20. A guidewire according to claim 18, wherein at least one of:
   a) the reflector includes a reflective surface coating;
   b) includes at least one of:
      i) a curved conical surface;
      ii) a curved conical surface configured to collimate stimulating radiation;
      iii) an at least partially parabolic surface; and,
      iv) a flat conical surface;
   c) is configured to generate an annular beam of stimulating radiation having a longitudinal width of at least one of:
      i) greater than 10 µm;
      ii) greater than 50 µm;
      iii) less than 200 µm; and,
      iv) about 100 µm.

* * * * *